United States Patent
Howard

(10) Patent No.: US 8,210,136 B2
(45) Date of Patent: Jul. 3, 2012

(54) TWO-STROKE OPPOSED CYLINDER INTERNAL COMBUSTION ENGINE WITH INTEGRATED POSITIVE DISPLACEMENT SUPERCHARGER AND REGENERATOR

(76) Inventor: Paul Allen Howard, Reston, VA (US)

( * ) Notice: Subject to any disclaimer, the term of this patent is extended or adjusted under 35 U.S.C. 154(b) by 644 days.

(21) Appl. No.: 12/344,257

(22) Filed: Dec. 25, 2008

(65) Prior Publication Data

US 2009/0165754 A1    Jul. 2, 2009

Related U.S. Application Data

(60) Provisional application No. 61/017,152, filed on Dec. 27, 2007.

(51) Int. Cl.
*F02B 59/00* (2006.01)
(52) U.S. Cl. .............. 123/42; 123/51 BC; 123/559.1; 123/74 R; 123/73 AV
(58) Field of Classification Search .............. 123/51 BC, 123/559.1, 54.1, 55.1, 55.2, 74 R, 73, 73 AV
See application file for complete search history.

(56) References Cited

U.S. PATENT DOCUMENTS

| | | | | |
|---|---|---|---|---|
| 3,677,027 A * | 7/1972 | Granryd | ........................... | 62/115 |
| 4,140,440 A * | 2/1979 | Ferris | ........................... | 417/343 |
| 4,284,055 A * | 8/1981 | Wakeman | ....................... | 123/556 |
| 4,437,437 A | 3/1984 | Erickson | | |
| 4,767,287 A | 8/1988 | Marks | | |
| 4,781,155 A * | 11/1988 | Brucker | ....................... | 123/70 V |
| 4,790,284 A * | 12/1988 | Ferrenberg et al. | ............ | 123/543 |
| 4,936,262 A * | 6/1990 | Paul et al. | .................... | 123/25 C |
| 4,996,953 A * | 3/1991 | Buck | ............................ | 123/51 A |
| 5,081,961 A * | 1/1992 | Paul et al. | .................... | 123/51 B |
| 5,323,738 A * | 6/1994 | Morse | ........................ | 123/43 AA |
| 5,341,774 A | 8/1994 | Erickson | | |
| 5,431,130 A * | 7/1995 | Brackett | ..................... | 123/70 R |
| 5,526,778 A | 6/1996 | Springer | | |
| 5,551,383 A * | 9/1996 | Novotny | .................. | 123/51 BD |
| 6,170,443 B1 | 1/2001 | Hofbauer | | |
| 6,182,619 B1 * | 2/2001 | Spitzer et al. | ............... | 123/51 B |
| 6,250,263 B1 * | 6/2001 | Sisco | .......................... | 123/51 R |
| 6,314,923 B1 | 11/2001 | Tompkins | | |
| 6,668,809 B2 * | 12/2003 | Lowi et al. | .................... | 123/543 |
| 7,121,235 B2 | 10/2006 | Schmied | | |
| 2003/0094164 A1* | 5/2003 | Lowi et al. | .................... | 123/543 |
| 2004/0035385 A1* | 2/2004 | Thomas et al. | ............... | 123/241 |
| 2006/0124084 A1* | 6/2006 | Hofbauer et al. | ............ | 123/55.7 |
| 2007/0245892 A1* | 10/2007 | Lemke et al. | ................ | 92/169.1 |

* cited by examiner

*Primary Examiner* — Noah Kamen
*Assistant Examiner* — Long T Tran
(74) *Attorney, Agent, or Firm* — Merek, Blackmon & Voorhees, LLC

(57) ABSTRACT

A two-stroke internal combustion engine (30) is disclosed. Fuel efficiency is improved and extended over a wide power band by an inlet air valve (108) which controls the air charge and maintains a constant compression ratio. An integrated positive displacement supercharger (50) provides adequate air charge at all power levels and recovers compressor power from unused supercharged air. An integrated post combustion chamber (48) extends the power stroke by mixing combustion gases with ambient air for farther expansion and power production. Exhaust noise is reduced because the combustion gases are vented from the engine at lower pressure, lower velocity and temperature. The opposed cylinder design provides nearly continuous power by combining supercharger power recovery with extended power strokes.

14 Claims, 15 Drawing Sheets

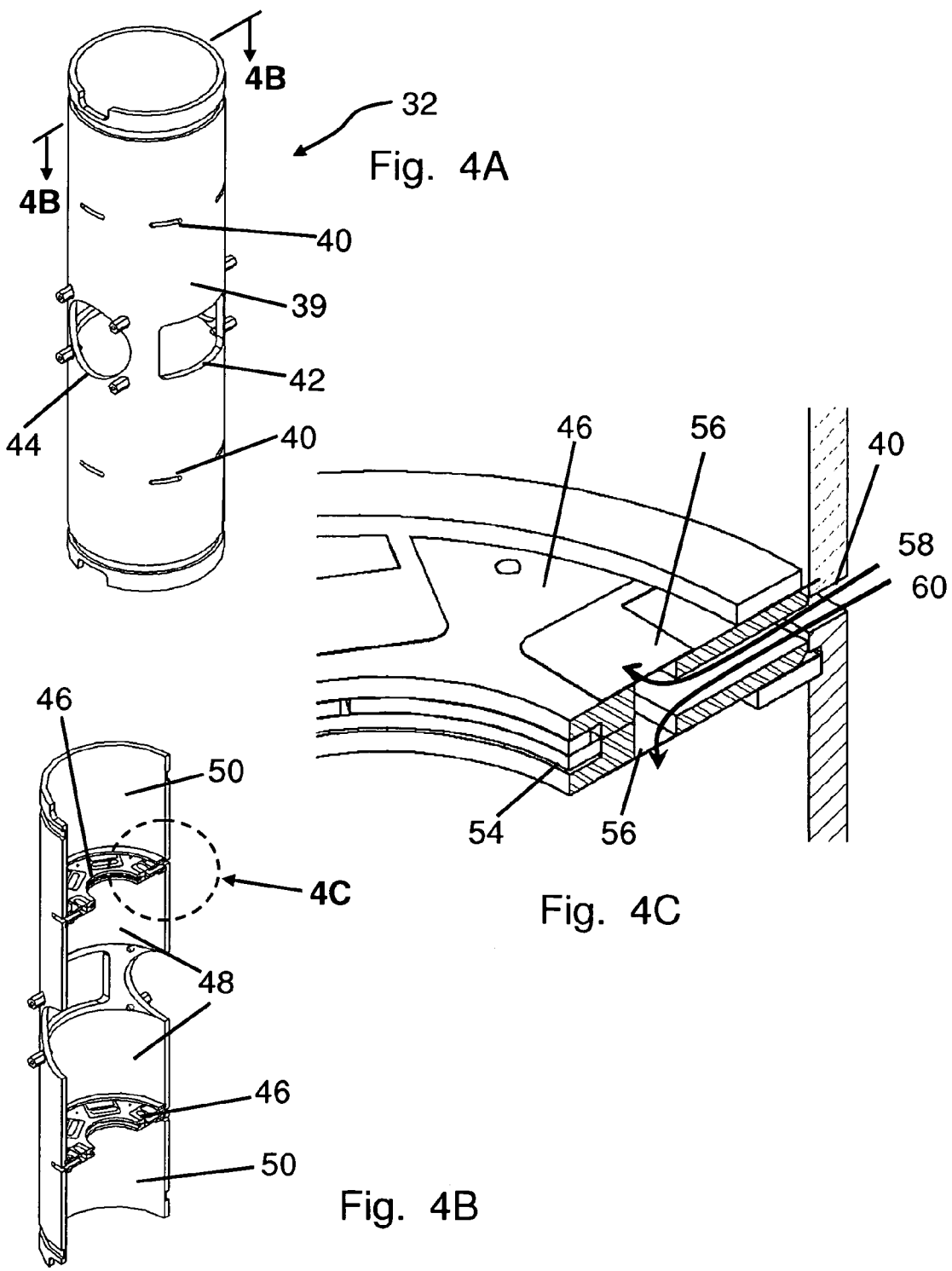

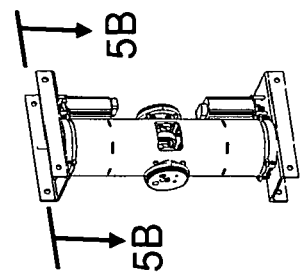
Fig. 5A
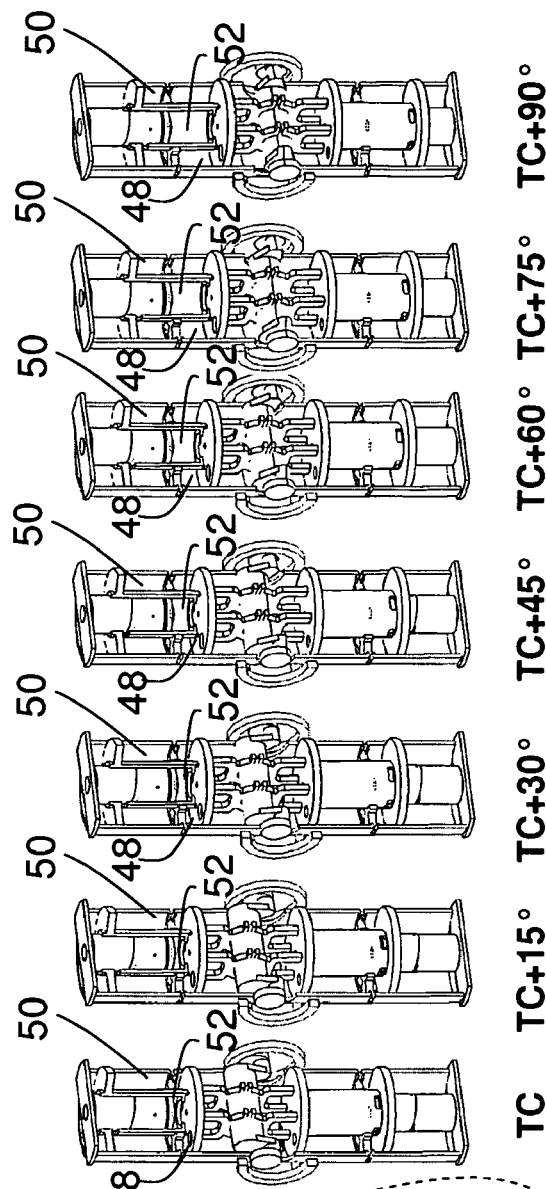
Fig. 5C - I
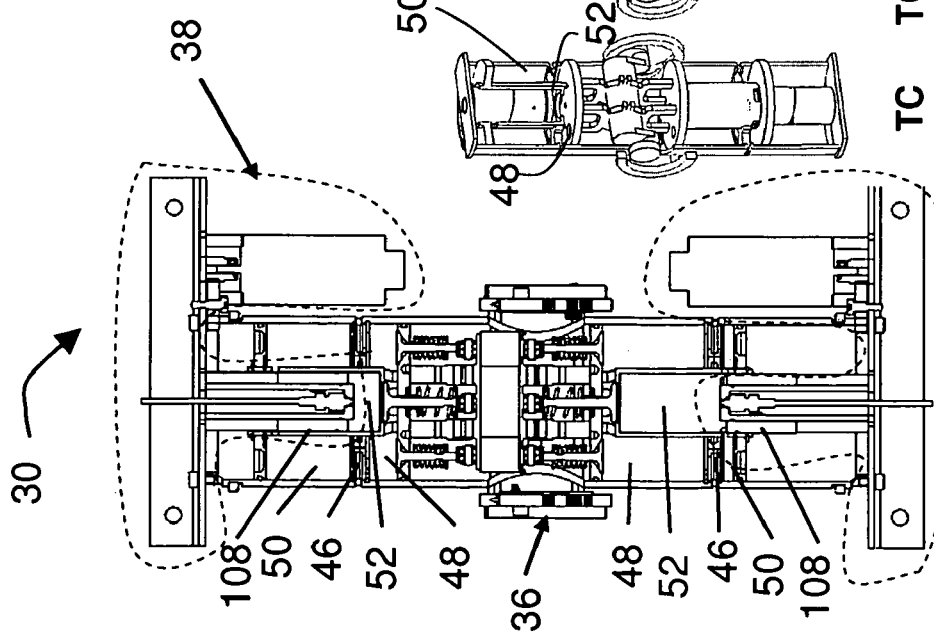
Fig. 5B

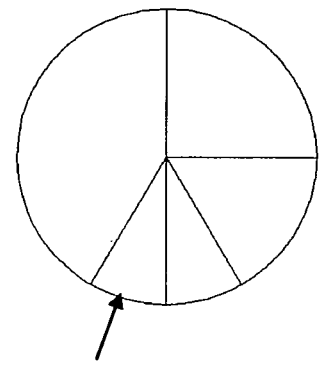
CHARGE
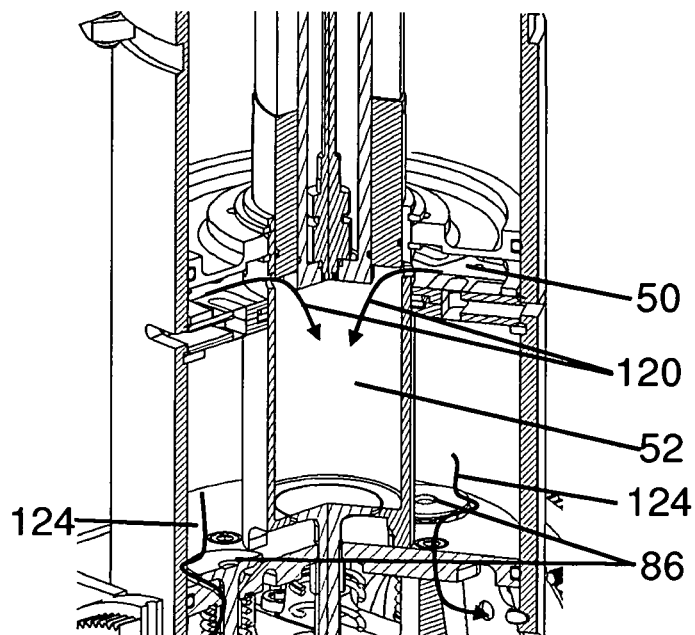
Fig. 15A
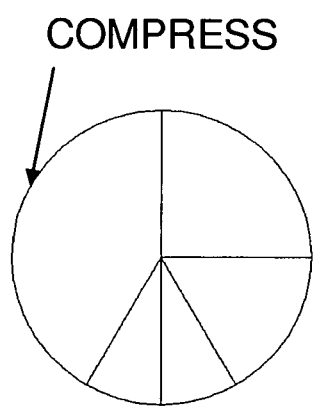
COMPRESS
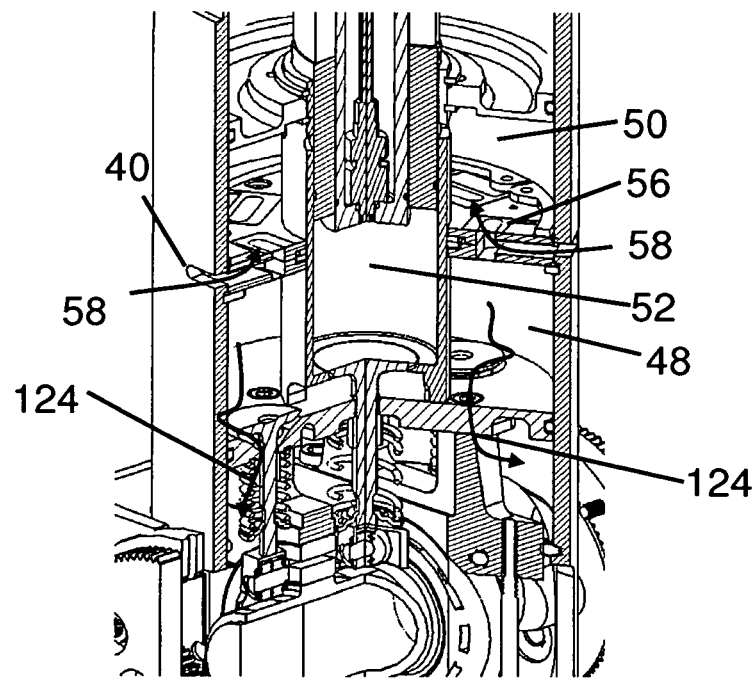
Fig. 15B

TWO-STROKE OPPOSED CYLINDER INTERNAL COMBUSTION ENGINE WITH INTEGRATED POSITIVE DISPLACEMENT SUPERCHARGER AND REGENERATOR

CROSS-REFERENCE TO RELATED APPLICATIONS

This application claims the benefit of provisional patent application 61/017,152 filed on 27 Dec. 2007 by the present inventor.

STATEMENT REGARDING FEDERALLY SPONSORED RESEARCH OR DEVELOPMENT

There has been no federal funding for this project.

REFERENCE TO SEQUENCE LISTING, A TABLE, OR A COMPUTER PROGRAM LISTING COMPACT DISC APPENDIX

Not applicable.

BACKGROUND OF THE INVENTION

1. Field of Invention

This invention relates to opposed reciprocating piston mechanisms such as internal combustion engines. The combustion chamber has a unique inlet air valve and volume adjuster. An integrated self-supercharger and regenerator are new and not previously seen.

2. Description of prior Art

An internal combustion engine is a machine that converts chemical energy to mechanical energy. The engine controls and surrounds the chemical reaction. The chemical reaction produces heat and combustion gases which are converted to mechanical power. The present art has improved this conversion efficiency however more energy is exhausted as hot gases than converted to mechanical power. Better conversion of these hot gases to power has been the target of many inventors.

A major improvement has been the addition of a turbocharger. Turbochargers use energy in the exhaust stream that would otherwise be wasted. The turbine in the exhaust stream effectively converts the exhaust manifold into a post-combustion chamber that salvages some the exhaust energy. The other half of a turbocharger is a compressor in the inlet manifold which adds a pre-combustion chamber to increase the air pressure and density of the air charge. A turbocharger increases efficiency because it salvages energy that would otherwise be lost and it increases power density because the same size engine can combust a greater mass of air/fuel.

As good as turbochargers are, they have some weaknesses: 1) They do not work at low power levels because the velocity of the exhaust gases is insufficient to drive the turbine; 2) At high power, they extract more power than needed to compress the inlet air charge; and 3) At high power the added boost increases the effective compression ratio and results in even higher energy content which is lost in the exhaust stream. It is the goal of my invention to correct these deficiencies.

U.S. Pat. No. 4,437,437 has a secondary expansion chamber to extend the power stroke. Erickson eliminates the simultaneous opening of the intake and exhaust valves. Erickson employed a suction chamber to aid in purging the combustion chamber. This improvement reduces the exhaust pressure to be below atmospheric to improve volumetric efficiency. In my design, the combustion chamber and regenerator are always at or above atmospheric pressure.

U.S. Pat. No. 5,341,774 is closer to a Wankel engine than a reciprocating engine with pistons. Erickson demonstrated improved fuel efficiency by extending the power stroke to another chamber. This is an extension of an earlier patent and is now supercharged in this patent. This engine has better fuel efficiency than a traditional two-stroke. It does not have a regenerative phase.

U.S. Pat. No. 4,767,287 has reciprocating piston movement and there are no connecting rods. However there is no supercharging, no multi-chambers and the cycle is not thermodynamically close to this invention.

U.S. Pat. No. 6,314,923 has opposed cylinders, used in a two-stroke engine without connecting rods. This invention uses poppet valves to eliminate simultaneous port openings and the resultant fuel loss. Each cylinder supercharges its mate. The supercharger is not self regulated as in the present invention and supercharges the opposed cylinder. This necessitates lengthy gas passageways. There is no regeneration chamber.

U.S. Pat. No. 7,121,235 has many features contained in U.S. Pat. No. 6,314,923. Similarities are: double pistons used in pairs, reciprocating piston without connecting rods, self supercharging and secondary expansion. However Schmied increases the compression ratio whereas the proposed invention maintains a constant compression ratio. Schmied's claim 6 is similar to U.S. Pat. No. 5,341,774. Schmied's invention has secondary expansion chambers. He uses ducting and secondary valves to transport the gases to the chambers. Schmied operates the exhaust valves with a belt arrangement, see his FIG. 66. My invention operates the exhaust valves directly from the crankpin. Schmied combines exhaust gases from a common port for each cylinder pair. Then he directs the combustion gases to the other cylinder to assist in supercharging. This is effectively a positive displacement supercharger assist. In my engine, the combustion gases move directly to an encircling regeneration chamber. My invention also inducts fresh cold air into the regenerator for each cycle. The combustion gases then heat the trapped cold air for farther expansion.

The value of two-stroke engines is explained and improved by Springer, U.S. Pat. No. 5,526,778 who discloses an adjacent supercharger to improve the air flow through a combustion chamber. Two-stroke engines are farther improved by Hofbauer in U.S. Pat. No. 6,170,443 where he uses two opposed cylinders to provide smooth power with supercharged axial scavenging. He also solves a dynamic problem by balancing the opposed piston weight. Marks, U.S. Pat. No. 4,767,287, discloses a clever way to reduce friction in opposed two-strokes engines by utilizing an oscillating cylinder.

BRIEF SUMMARY OF THE INVENTION

Accordingly, it is the object of the present invention to integrate into an engine many of the improvements and benefits prior inventors have sought. A novel engine geometry and motion will be disclosed which is efficient over a wide operating range. The proposed invention is a two-stroke opposed cylinder internal combustion engine. The combustion chamber has a unique inlet valve that controls the air charge and maintains a constant compression ratio. Two annular cylinders encircle each combustion chamber. One annular cylinder is a chamber that is a self regulating supercharger. The other annular cylinder is a chamber that is a secondary expansion chamber. The secondary expansion chamber improves efficiency by extending the power stroke and converting thermal energy of the exhaust gases into increased pressure by heating cold air trapped inside it. It also reduces noise by slowly releasing the exhaust gases at a low pressure and temperature.

BRIEF DESCRIPTION OF THE DRAWINGS

FIGS. 4A-C show an isometric, sectional and detailed view of a cylinder housing assembly.

FIG. 5A shows the preferred embodiment and section line for FIG. 5B

FIG. 5B shows a sectional view of the preferred embodiment.

FIGS. 5C-I illustrate varying volumes of the supercharger, regenerator and combustion chamber at different degrees of crankpin drive mechanism rotation.

FIG. 15A is a sectional view of one cylinder, at 200° (charge) and full power.

FIG. 15B is a sectional view of one cylinder, at 270° (compress) and full power.

Figure 1A:
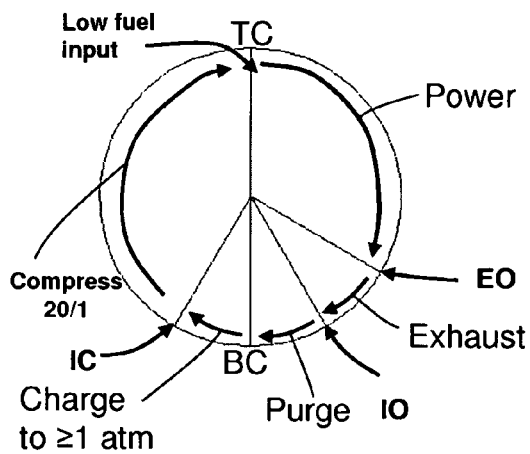
FIGS. 1A-F show a conventional two-cycle engine process and its thermodynamic states.

REFERENCE NUMERALS 30 preferred embodiment
34 double piston
38 inlet valve assembly
40 inlet air ports
44 planetary access hole
48 regenerator chamber
52 Combustion chamber
56 reed valve
58 air entering the supercharger
62 crankpin shaft
66 transfer cam lobe
70 offset crank
74 ring gear
78 PTO (power take off) bearing
80 planetary gear axis
84 cam follower
88 regenerator piston
92 transfer passageway
94 supercharger piston
98 end plate
102 controlling device
104 riser gear
108 inlet valve
111 rotation to add power
113 rotation to reduce power
116 fuel injectors
120 supercharged air
124 exhaust gases
32 cylinder housing assembly
36 planetary crankpin drive mechanism
39 cylinder housing
42 main bearing access hole
46 fixed annular partition
50 supercharger chamber
54 sliding seal
60 air entering the regenerator
64 exhaust cam lobe
68 main bearing
72 planetary gear
76 planetary idler gears
79 PTO (power take-off) gear
82 main bearing boss
86 exhaust valve
90 combustion chamber body
93 transfer valve
96 combustion chamber inlet port
100 clamping device
106 riser
110 injector barrel
112 movement to add power
114 movement to reduce power
118 injector barrel slot
122 combustion gases

DETAILED DESCRIPTION OF THE INVENTION

Convention

This description utilizes conventional terms used in the art. TC (Top Center) means when the combustion chamber is at minimum volume and ready for the combustion process. BC (Bottom Center) means that the combustion chamber is at maximum volume. It is understood that seals, bearings, guides, rings, valve keepers and other traditional parts in conventional engines are necessary and present. Cooling systems, lubrication, sensors, control systems and fuel injectors are complimentary technologies and necessary. The fuel used in this invention could be any of the traditional fuels used in internal combustion engines such as diesel, bio-fuel or gasoline. This invention will work well with any materials suitable for engine use. Consequently, this description does not labor the reader with such details.

Thermodynamic Review of Conventional Engines

Conventional two-stroke engines vary power by controlling fuel flow and have a complete cycle in one revolution of the crankshaft. A constant amount of air is compressed on each rotation. Conventional engines are usually designed for an optimum air/fuel mixture at full power. Consequently they have a "lean burn" at less than full power. A review of the traditional two-stroke process at low power is done in FIGS.

1A, C & E. Refer to FIG. 1A: the process starts with the power stroke at TC. The burning air/fuel mixture expands and pushes against the piston to produce power. The power stroke continues until the exhaust valve opens, denoted as EO and combustion gases are released.

As the piston continues to move down, the inlet ports open (identified as 10 in FIG. 1A) and purging begins. Purging is the process of pushing out the combustion gases with fresh air. Purging ends with the closing of the exhaust valve. This is usually at BC, when the combustion chamber is at maximum volume.

The charging process begins at BC. The supercharger must have sufficient volume and pressure to both purge and charge the combustion chamber. The power to operate the supercharger reduces the net power output. Some designers have added a turbocharger to supplement the supercharger but turbochargers are only effective at high speed. A supercharger is necessary to start a two-stroke engine.

The compression process begins when the inlet port is closed, denoted IC in FIG. 1A. The minimum compression ratio depends on operating conditions and fuel; a compression ratio of 20 to one (20/1) is typical. At less than full power, excess air is compressed in the combustion chamber which is not needed for combustion. The power to compress this excess air reduces net power output. In addition the excess air mixes with the combustion gases and lowers the peak burn temperature. It is well known within the art that lowering the peak temperature reduces efficiency. Conventional engines have another problem at low power known as "wet stacking" or unburnt fuel in the exhaust. This is caused by the excess air depressing the temperature and preventing complete combustion.

Figure 1B:
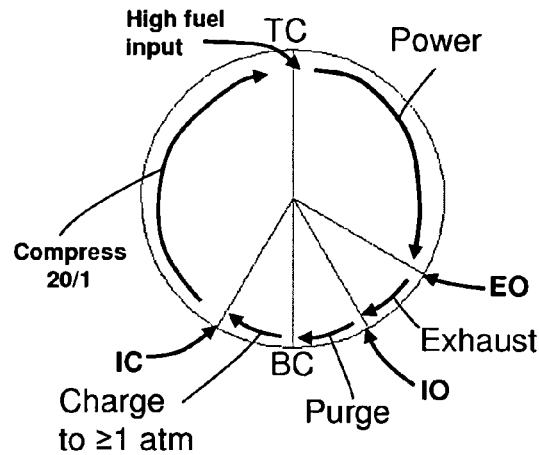

A traditional review of the two-stroke process at full power is done in FIGS. 1B, D & F. Notice that FIGS. 1A & B are identical except the amount of fuel that is used. The power stroke ends when the exhaust valve opens. The pressure within the combustion chamber must be reduced to be less than the supercharger to allow purging. Conventional engine designers must do a tradeoff study to weigh the impact of delaying the opening of the exhaust valve and extending the power stroke. If the exhaust opening is delayed, very large and fast exhaust valves are needed. If the exhaust valves open early, the power stroke and net power is reduced. There is yet another problem with conventional engines. Exhaust valves are usually near the fuel injector which increases the possibility of unburnt fuel leaving the combustion chamber.

Figure 1C:
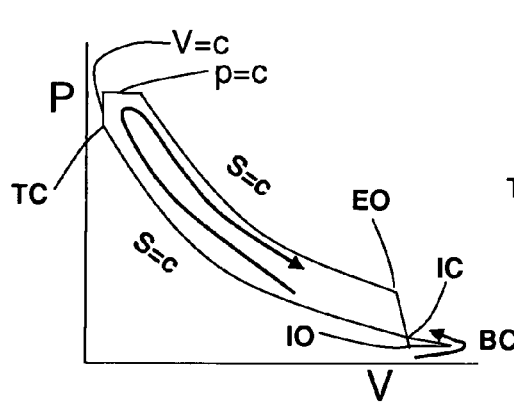
Figure 1D:
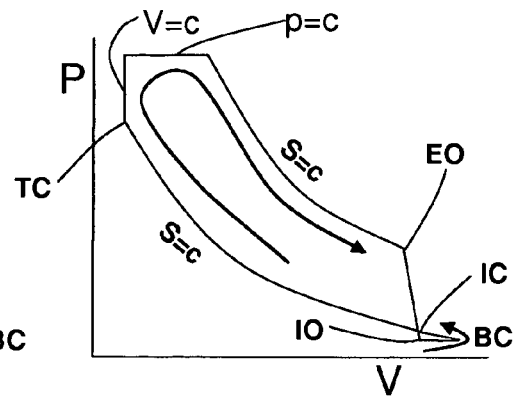

Thermodynamic graphs illustrate the conventional engine process as PV (pressure volume) curves in FIGS. 1C & D. The combustion is shown as a dual cycle as is typical in engine analysis. Half of the heat input is modeled as increased pressure and half as increased volume. The large amount of fuel in the high power case (FIG. 1D) increases the pressure and temperature more than in the low power case. The power stroke is shown as an isentropic process; it ends when the exhaust valve opens (EO). The exhaust (from points EO to IO), purging (from points IO to BC) and charge process (from points BC to IC) are all limited by the valve size, speed and lift which are difficult design choices. The cycle is completed with the compression process, from IC to TC, which is simplified as an isentropic process. The area encircled within the graph is proportional to the net power. Adding more fuel, FIG. 1D, increases the encircled area and net power out.

Inspection of FIGS. 1C & D shows one of the problems that conventional engine designers face. The volume of the combustion gases at full power is greater than at low power. If the exhaust valve opens early enough for the full power case it will be opening too early for the low power case. The premature release of exhaust gases reduces efficiency.

Figure 1E:
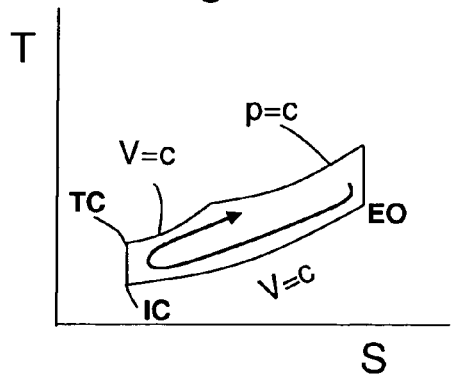
Figure 1F:
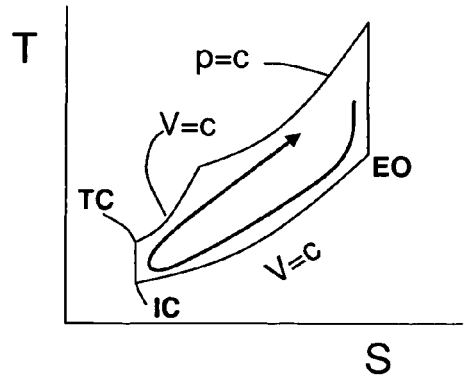

Idealized T-S (temperature-entropy) graphs illustrate a conventional two-stroke engine in FIGS. 1E & F. Dual cycle combustion is again assumed. Since the same air charge is compressed at low and high power, the starting conditions before combustion are identical. The work required to compress the air charge is proportional to the change in temperature. The power produced by the engine is proportional to the change in temperature during the power stroke. The high power case has a larger change in temperature.

Inspection of FIGS. 1E & F shows another problem that conventional engine designers face. Consider the low power case. The work required to compress the inlet charge is almost as big as the power produced in the power stroke. Most of the air does not contribute to combustion but must be compressed and brought up to ignition temperature. This is part of the "lean burn" process mentioned earlier. Besides reduced efficiency, the "lean burn" has another weakness. Excess oxygen in the combustion chamber leads to the formation of nitrous oxides in the combustion gases. This is a pollutant.

Farther inspection of FIGS. 1E & F reveal another weakness in conventional engines. The exhaust temperature in the high power case is greater than in the low power case (higher temperature at point EO). It is well understood that the exhaust gases are the greatest energy loss within an engine. Much effort and many improvements within the art have been directed to this end. Even so, the exhaust gases are the biggest energy loss.

Thermodynamic Review of the Improved Engine

Figure 2A:
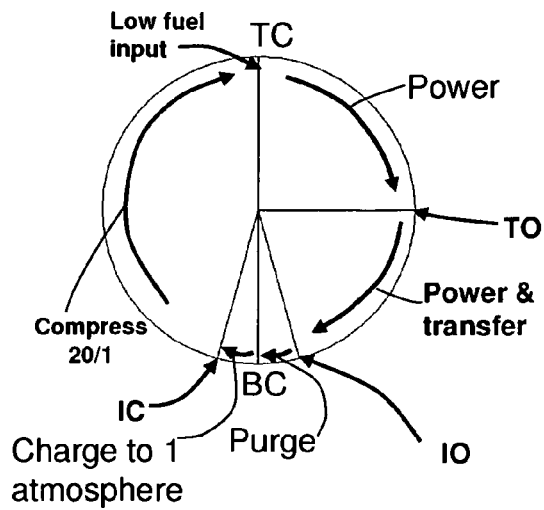
FIGS. 2A-F show the invention's process and thermodynamic states.

Now my engine is reviewed in the same manner. FIGS. 2A, C & E show the low power case. As before, the power stroke begins at TC. The volume of the combustion chamber expands and produces power. About half way through the power stroke (90° in the preferred embodiment), a transfer valve opens (denoted as TO in FIG. 2A) and combustion gases flow and mix in a sealed adjacent chamber. The secondary expansion chamber is the regenerator. The process after the transfer valve opens is denoted as "power and transfer". The combustion chamber pressure drops and regenerator rises. The volume of the preferred regenerator is six times that of the combustion chamber. Consequently the mass of air in the regenerator is approximately equal to the mass of combustion gases in the combustion chamber.

The regenerator solves two weaknesses of the conventional engine: 1) the combustion gases can fully expand and produce power until its pressure has dropped to atmospheric or close to atmospheric; and 2) the exhaust valve size and speed requirements are eliminated. Before the transfer valve opens, the regenerator fills with ambient (much colder than the exhaust gases) air through one-way valves. When the transfer valve opens, hot combustion gases mix with the air trapped in the regenerator chamber. Mixing of hot exhaust gases with cold air efficiently converts the thermal energy of the exhaust to expanded gas. Since this gas is inside a sealed chamber and its expansion presses against the crankpin, the regenerator produces power.

The purging process begins when the inlet valve is opened; denoted IO in FIGS. 2A & B. Notice that the duration of the purge process is longer in full power mode. Pressurized air from the supercharger flushes out the combustion chamber from end to end, axial scavenging. This process continues until BC, when the transfer valve closes. My engine solves another weakness in conventional engines: purging of the combustion chamber is usually done with exhaust valves near the fuel injector. This forces any unburnt fuel immediately out of the combustion chamber. In the new design, the fuel injector is at the opposite end as the transfer valve.

The charging process begins at BC. Notice that the charging process is longer and that the charged pressure is greater in full power mode. This is accomplished by an inlet valve. This valve elegantly solves a major weakness in conventional engines: varying the air charge to the combustion chamber while maintaining a constant compression ratio. Covering the inlet ports to reduce the air charge would normally reduce the effective compression ratio by starving the cylinder for air. This would prevent self ignition. The new design solves this problem by using an inlet valve which is of the sliding gate type, has an area of at least half of the cylinder and its movement changes the volume of the combustion chamber. Thus moving the inlet valve covers the inlet ports and reduces the air intake but also reduces the compressed volume of the combustion chamber.

Figure 2B:
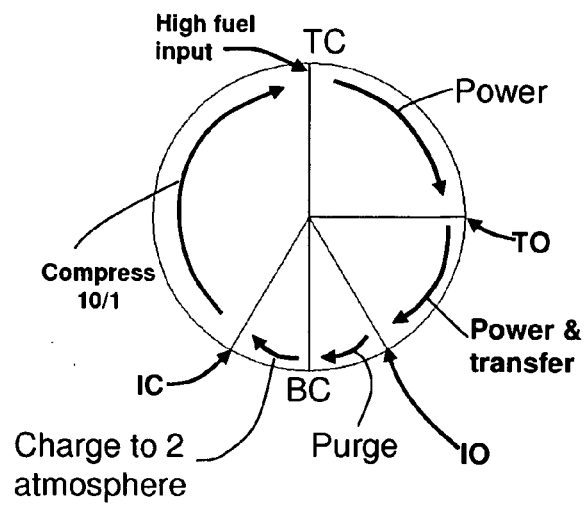

The compression phase begins when the inlet valve closes. This is denoted as IC in FIGS. 2A & B. The movement of the inlet valve changes the position of IC in FIGS. 2A & B. At TC, the air charge is fully compressed and process repeats. In FIG. 2A: at IC the combustion chamber is at 1 atmosphere pressure and will be compressed to 20 to 1 at TC. In FIG. 2B, at IC the combustion chamber is at 2 atmospheres and will be compressed 10 to 1 at TC. The position of the inlet valve has double the combustion chamber volume at TC.

Figure 2C:
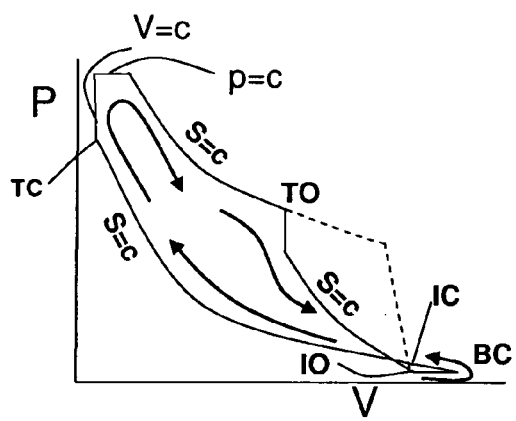

My invention's thermodynamic process at low power is shown as a PV curve in FIG. 2C. The combustion is shown as a dual cycle as is typical in engine analysis. The power stroke is shown as an isentropic process. The power stroke continues after the transfer valve opens (denoted TO) but at lower pressure. Purging takes place from IO to BC; BC is at maximum volume. Charging takes place from BC to IC. The cycle is completed with the isentropic compression process from IC to TC. The exhaust phase is eliminated from the combustion chamber. The area encircled within the graph is proportional to the net power. The additional power produced in the regenerator is illustrated by the dashed lines in FIGS. 2C.

Figure 2D:
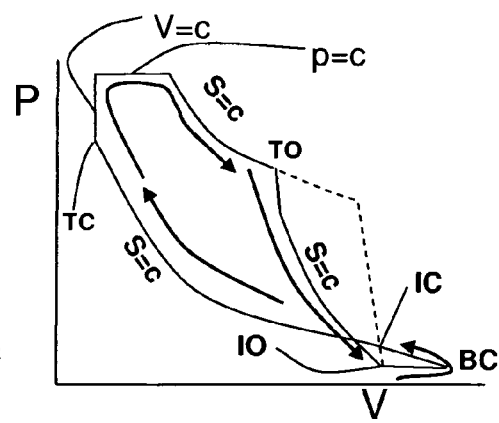

My invention's thermodynamic process at high power is shown as a PV curve in FIG. 2D. When the compression stroke starts, (IC in the figure) the high power case has twice the pressure as the low power case. At TC has the high power case has twice the volume. The power stroke expansion is greater than in a conventional engine because the combustion chamber is twice as big. The dashed lines illustrate the additional power recovered from the regenerator.

Figure 2E:
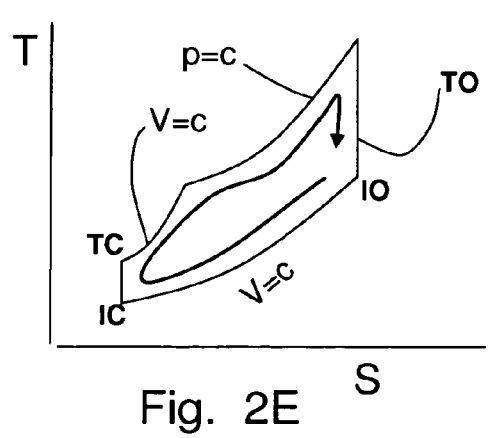
Figure 2F:
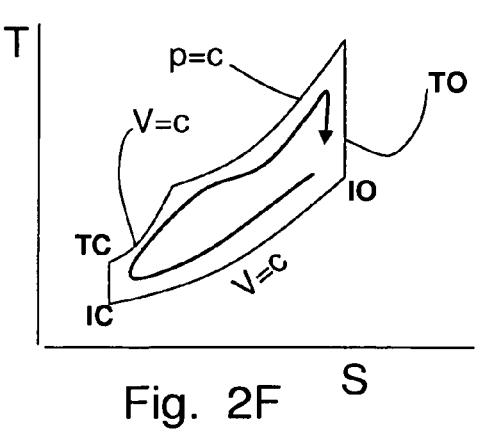

Idealized Temperature-entropy graphs illustrate the new design in FIGS. 2E & F. Dual cycle combustion is again assumed. Since temperature and entropy are intrinsic properties, the graphs are nearly identical. The excess air depressing the burn temperature at low power is eliminated. This weakness of conventional engines (shown in FIGS. 1E & F) is gone.

Inlet Valve Sizing Example

The principle of operation of the inlet valve is not limited to a particular ratio. However an example will make the explanation obvious. Assume an engine with a stroke of 80 mm and a combustion chamber area of 2000 mm$^2$. Assume the combustion chamber has a nominal compression ratio of 20/1. The compressed volume of the combustion chamber is (80 mm*2000 mm$^2$/20)=8000 mm$^3$. Assume the stroke of the inlet valve is 10% of the engine stroke, 8 mm. Assume the axial length of the inlet port is also 8 mm. Thus the inlet valve can control the inlet charge from zero to full flow.

In the no power case, the inlet valve covers the inlet port and we have no air charge, no purging and of course no fuel. The residual combustion gases in the combustion chamber would be essentially at atmospheric pressure. They will be compressed 20 to 1.

Consider the full power case when the inlet valve does not cover the inlet port. If the area of the inlet valve were ½ of the combustion chamber area, it would be 1000 mm$^2$. If the valve were moved 8 mm, it would change the volume of the combustion chamber by 8000 mm$^3$. This would double the volume and halve the compression ratio to 10/1. However now the inlet ports are fully open and the supercharger charges the combustion chamber (in this explanation) to 2 atmospheres. The resulting effective compression ratio remains at 20/1.

A designer skilled in the art can select an inlet port shape that linearizes the relation between inlet air charge and combustion chamber volume. Thus by combining a sufficiently large supercharger with a massive inlet valve, we can vary the inlet air charge while maintaining a constant compression ratio.

Preferred Embodiment

Figure 3:
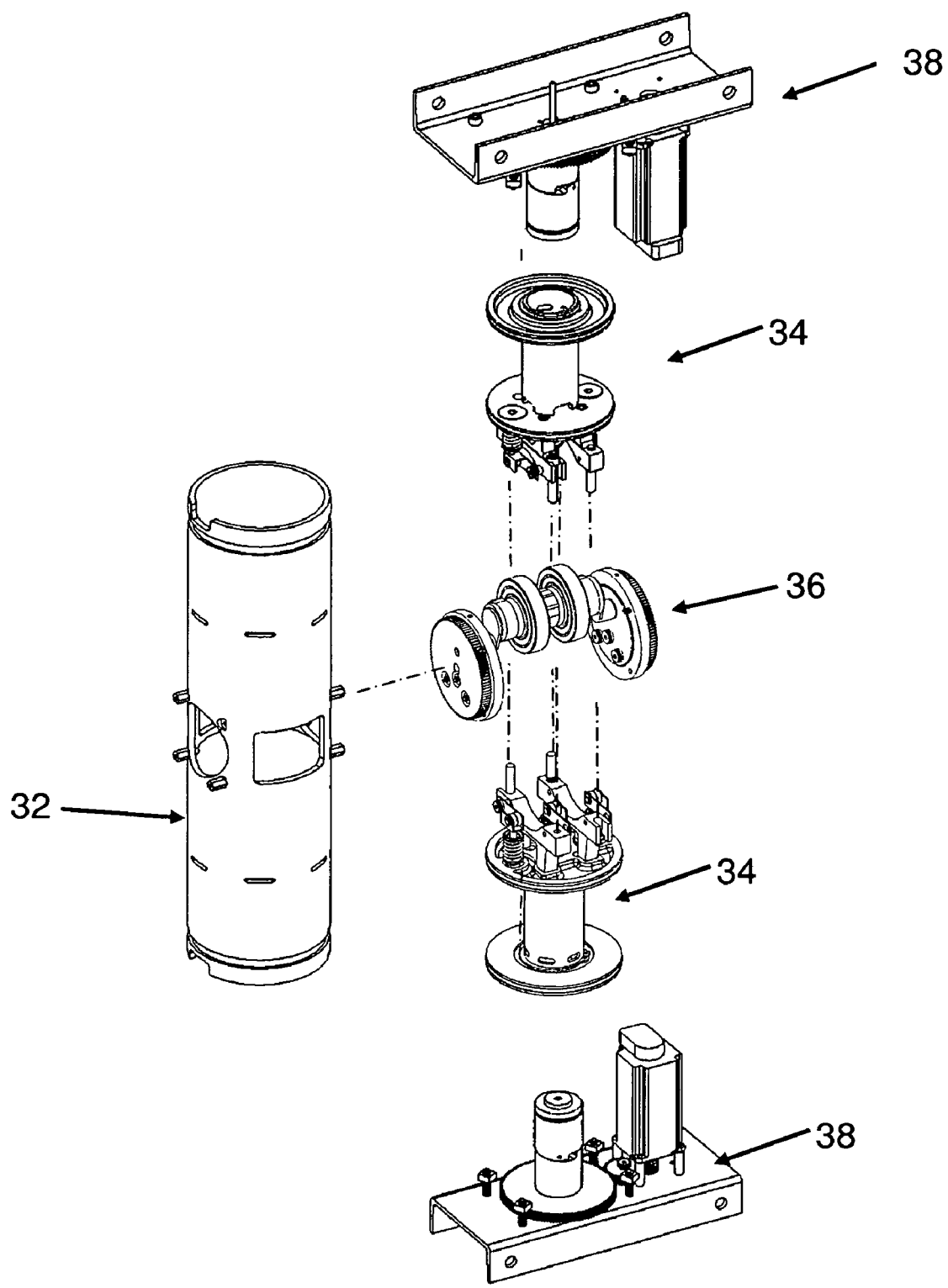
FIG. 3 shows an exploded view of the preferred embodiment of my engine and its main subassemblies.

FIG. 3 shows an exploded isometric view of the preferred embodiment. The dominate feature of the engine is the cylinder housing assembly 32. The engine will have at least one cylinder housing assembly. The cylinder housing assembly has two opposed cylinders. Each cylinder surrounds a double piston 34. The double pistons join together and rotatably join the double pistons to the planetary crankpin drive mechanism 36. Each cylinder housing assembly will have one centrally located planetary crankpin drive mechanisms. The reciprocating motion of the pistons is controlled by the crankpin drive mechanism. Power is extracted from the engine (or applied to the engine for starting) by the crankpin drive mechanism. Each cylinder is capped with an inlet valve assembly 38.

Alternate embodiments include multiple cylinder housing assemblies. If the housings are in-line, the inlet valve assembly can be extended to operate multiple cylinders. Likewise the planetary gear assemblies can be coupled. Dynamic oscillations can be mitigated if the reciprocating masses move in opposite directions (180° out of phase). If the cylinder housing assemblies are not in-line, the dynamic performance can be altered to improve smoothness of torque. Another alternate embodiment could employ eccentric bearings to support the crankpin drive mechanism instead of planetary gears.

FIG. 4A shows an isometric view of the cylinder housing assembly. The main part of the cylinder housing assembly is an open ended cylinder, the cylinder housing 39. Inlet air ports 40 are located circumferentially about midway to each end of the cylinder housing assembly. The centrally located planetary crankpin drive mechanism extends into the cylinder housing through planetary access holes 44. The main bearing access holes 42 provide access to the double pistons and are the exhaust ports. FIG. 4B shows a section view (from FIG. 4A) of the cylinder housing assembly. There is a fixed annular partition 46 inside each cylinder. On the inward facing surface of the partition is the regenerator chamber 48. On the outward facing surface is the supercharger chamber 50

FIG. 4C shows a detail view of FIG. 4B. Sealing between the chambers is accomplished with a sliding seal 54. The double pistons have reciprocating motion as controlled by the planetary crankpin drive mechanism. This motion allows the supercharger and regenerator volumes to change complementarily. All air enters through inlet air ports 40. Air flow is controlled by reed valves 56 which allow air to flow in one direction only. When the supercharger is expanding, air enters it 58. When the regenerator is expanding, air enters it 60. One is expanding while the other is contracting. Therefore inlet ports 40 are sufficient for air flow to both supercharger and regenerator.

FIG. 5A shows the preferred embodiment of a single cylinder housing assembly engine 30. The section line through FIG. 5A locates the section plane for FIG. 5B. Sectional drawing 5B locates the supercharger and regenerator. The centrally located planetary crankpin drive mechanism is in the middle. Double pistons encircle it. The cylinders are capped with inlet valve assemblies 38. The inlet valves project into the double pistons and create the combustion chambers 52. Each cylinder has a fixed annular partition 46; hence there are two fixed partitions in the cylinder housing assembly. Each partition, in conjunction with the double piston define the boundary of the supercharger and regenerator chamber. The chamber closer to the crankpin drive mechanism is the regenerator chamber 48. The chamber farther from the planetary crankpin drive mechanism is the supercharger chamber 50. The reciprocating motion of the double piston changes the volume of these three chambers. FIGS. 5C-I show the changing volumes as the planetary crankpin drive mechanism rotates. Since this is an opposed engine, the opposite cylinder is 180° out of phase. This is an important advantage of this design. When one cylinder requires power to compress the air charge, the companion cylinder provides that power directly without any gearing or linkage. This smoothes the power output.

Combustion chambers of traditional engines have a fixed cylinder and a movable piston. Reciprocating motion of the piston alternately compresses or extractors power from the gases within the combustion chamber. Review of FIGS. 5C-I show that my engine's combustion chamber is different. Motion is from the reciprocating cylinder which is part of double piston 34. The inlet valve assembly is the fixed piston.

Figure 6:
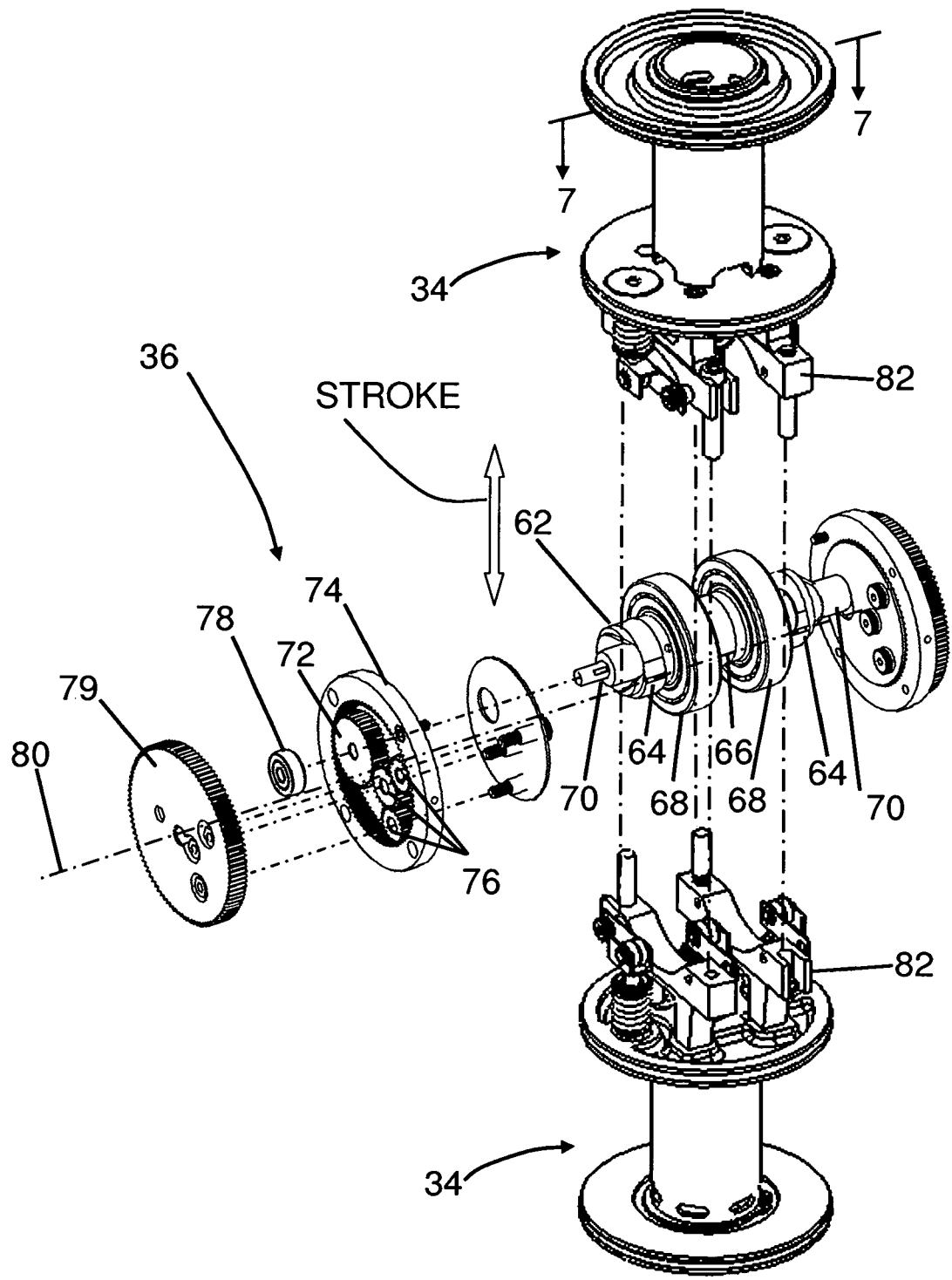
FIG. 6 shows an exploded view of the planetary crankpin drive mechanism and double pistons.

FIG. 6 shows an exploded view of the planetary crankpin drive mechanism 36 and the double pistons 34. The main component of the planetary crankpin drive mechanism is the crankpin shaft 62. The crankpin shaft has two exhaust cam lobes 64 and one transfer cam lobe 66. Each lobe operates two valves. Integrating cam lobes onto the crankpin allow the crankpin to function as a camshaft. The crankpin shaft has main bearings 68. The main bearings rotatably attach the double pistons to the crankpin shaft. Each end of the crankpin shaft is supported and keyed to an offset crank 70. Each offset crank is supported and keyed to a planetary gear 72. The planetary gear engages and rotates within ring gear 74. The ring gear has twice as many teeth as the planetary gear. The resultant motion of the crankpin shaft is reciprocating as indicated by the arrow in the FIG. 6. The planetary idler gears, 76, maintain engagement with the ring gear. PTO (power take-off) bearing 78 rotatably connects the offset crank to PTO (power take-off) gear 79. The PTO gear has rotary motion. Typically the PTO gear would be used to extract power from the engine or used during starting.

The crankpin shaft 62 has compound motion: it reciprocates and rotates. The reciprocating motion is the engine stroke. The crankpin shaft makes one revolution for each complete cycle of the reciprocating motion. The cam lobes 64 and 66 actuate each valve once per revolution. The axis of the crankpin shaft 80 is normal to the central axis of the cylinder housing assembly.

Figure 7:
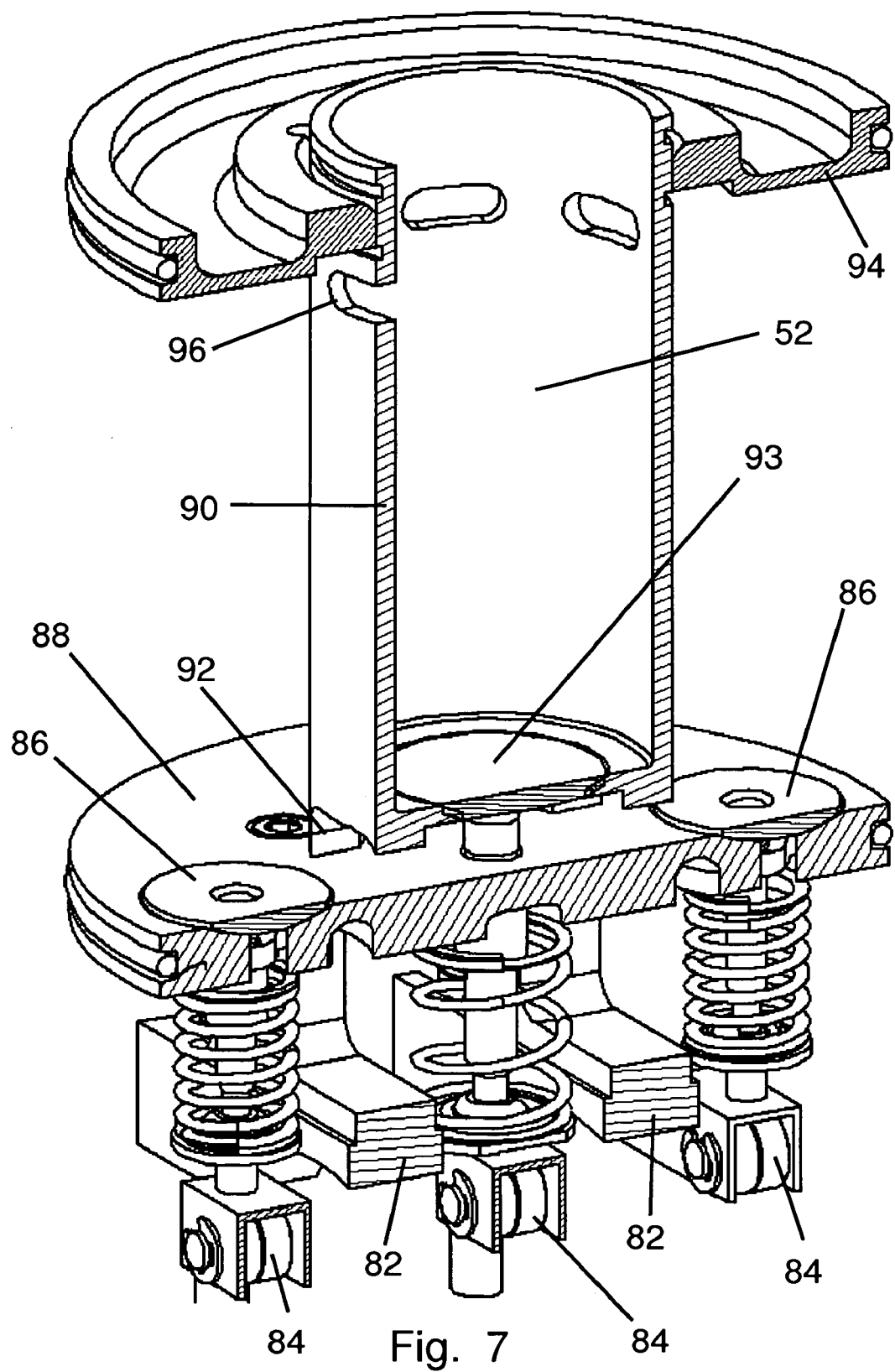
FIG. 7 shows a sectional view of a double piston.

FIG. 7 shows a detailed sectional view (from FIG. 6) of the double piston 34. The double pistons are clamped to each. This is done with the main bearing boss 82. Joining the main bearing bosses encircles the main bearings 68. Cam followers 84 are rotatable attached to the main bearing boss; there is one cam follower for each valve. The crankpin cam surface actuates the valves as the crankpin rotates. Each double piston has two exhaust valves 86. The exhaust valves are seated in regenerator piston 88. The regenerator piston supports the combustion chamber body 90. The attachment between the regenerator piston and combustion chamber body is intermittent. The openings are the transfer passageways 92. Combustion gases from the combustion chamber exit the combustion chamber 52 through a transfer valve 93. The valve is actuated by cam follower 84. The combustion chamber body is attached to the supercharger piston 94. Combustion chamber inlet ports 96 are located circumferentially around one end of the combustion chamber. In the preferred embodiment, the height of the ports is 10% of the engine stroke. These ports are opened to allow compressed air from the supercharger to enter the combustion chamber. Otherwise these ports are closed.

The preferred embodiment has reed valves 56 located in the fixed partition. An alternate embodiment would locate the supercharger reed valves in the supercharger piston. An alternate embodiment would locate the regenerator reed valves in the regenerator piston.

With the previous explanation, the boundary of the combustion chamber 52 can now be defined. The combustion chamber is a right cylinder where the wall is the combustion chamber body 90. The base of the combustion chamber body with the transfer valve is one end. The other end is part of the inlet valve assembly, which is shown in FIG. 3.

The previous explanation allows farther description of the supercharger chamber 50. The supercharger is an annular cylinder where one end is the supercharger piston 94 and the other end is the fixed annular partition 46. The inner wall is the combustion chamber body 90. The outer wall is the cylinder housing 39.

The previous explanation allows farther description of the regenerator chamber 48. The regenerator chamber, 48, is an annular cylinder. One end is the regenerator piston 88 and the other end is the fixed annular partition 46. The inner wall is the combustion chamber body 90 and the outer wall is the cylinder housing 39.

Inlet Valve Assembly

Figure 8A:
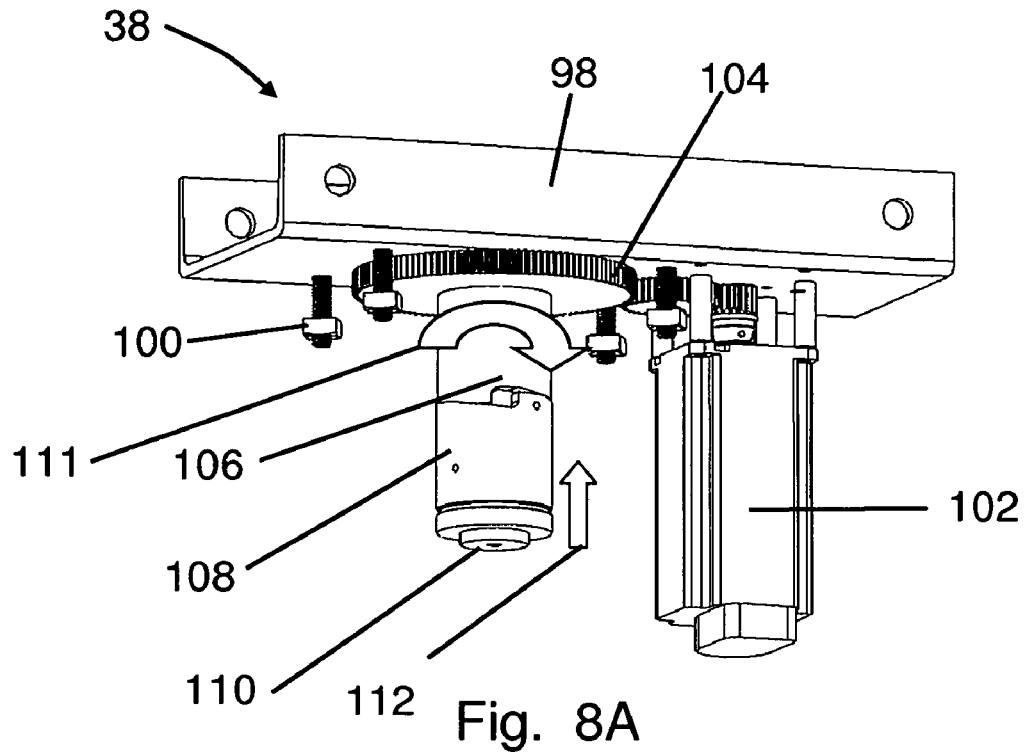
FIG. 8A shows an isometric view of the preferred embodiment of an inlet valve subassembly in a full power position.
Figure 8B:
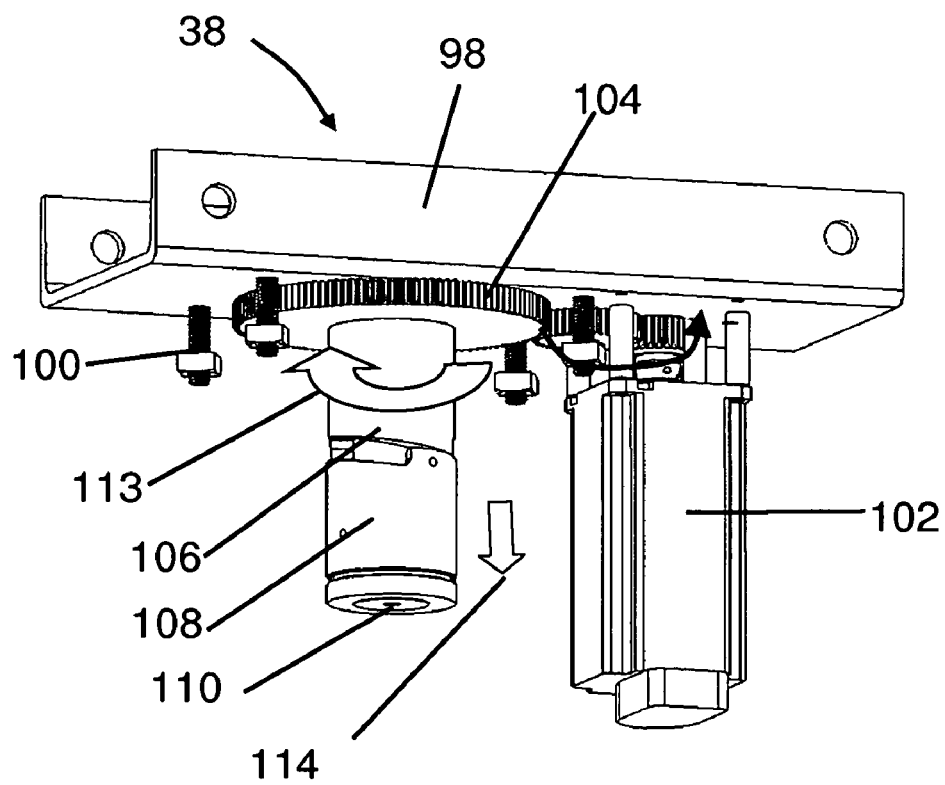
FIG. 8B shows an isometric view of the preferred embodiment of an inlet valve subassembly in a low power position.

FIGS. 8A & B show the inlet valve assemblies for the preferred embodiment. The inlet valve is a throttle that controls the air charge to the combustion chamber. FIG. 8A shows the assembly 38 in a full power (full flow) position. FIG. 8B shows the assembly in a low power (low flow) position. Clamping the end plate 98 to the cylinder housing assembly can be done in many ways. A clamping device 100 is illustrated. The inlet valve must be adjustable to control the air charge. This can be done in many ways and does not affect the improvement of my engine. A controlling device 102 such as a stepper motor is illustrated and attached to the end plate. The inlet valves will be exposed to the full pressure inside the combustion chamber. Hence a large mechanical advantage is needed. The stepper motor rotates riser gear 104. This gear is keyed to riser 106 so rotating the riser gear also rotates the riser. The riser has a helical end. The inlet valve 108 has an identical helical end but can not rotate. Thus rotating the riser adjusts the height of the inlet valve. The injector barrel 110 is fixed and provides an installation point for a fuel injector. Rotation 111 results in movement 112 which will increase the air charge to the combustion chamber. In FIG. 8A, the inlet valve is offset from the injector barrel face and indicative of a significant power condition.

FIG. 8B shows the inlet valve assembly in a low or no power position. Arrow 113 in FIG. 8B shows the rotation of the riser which will reduce the air charge to the combustion chamber. Rotation 113 results in movement 114 which will reduce the air charge to the combustion chamber. In FIG. 8B, the inlet valve is flush with the injector barrel face and indicative of a low or no power condition. This movement 114 exposes less of the combustion chamber inlet port 96 at the top of the combustion chamber.

Figures 9A, 9B:
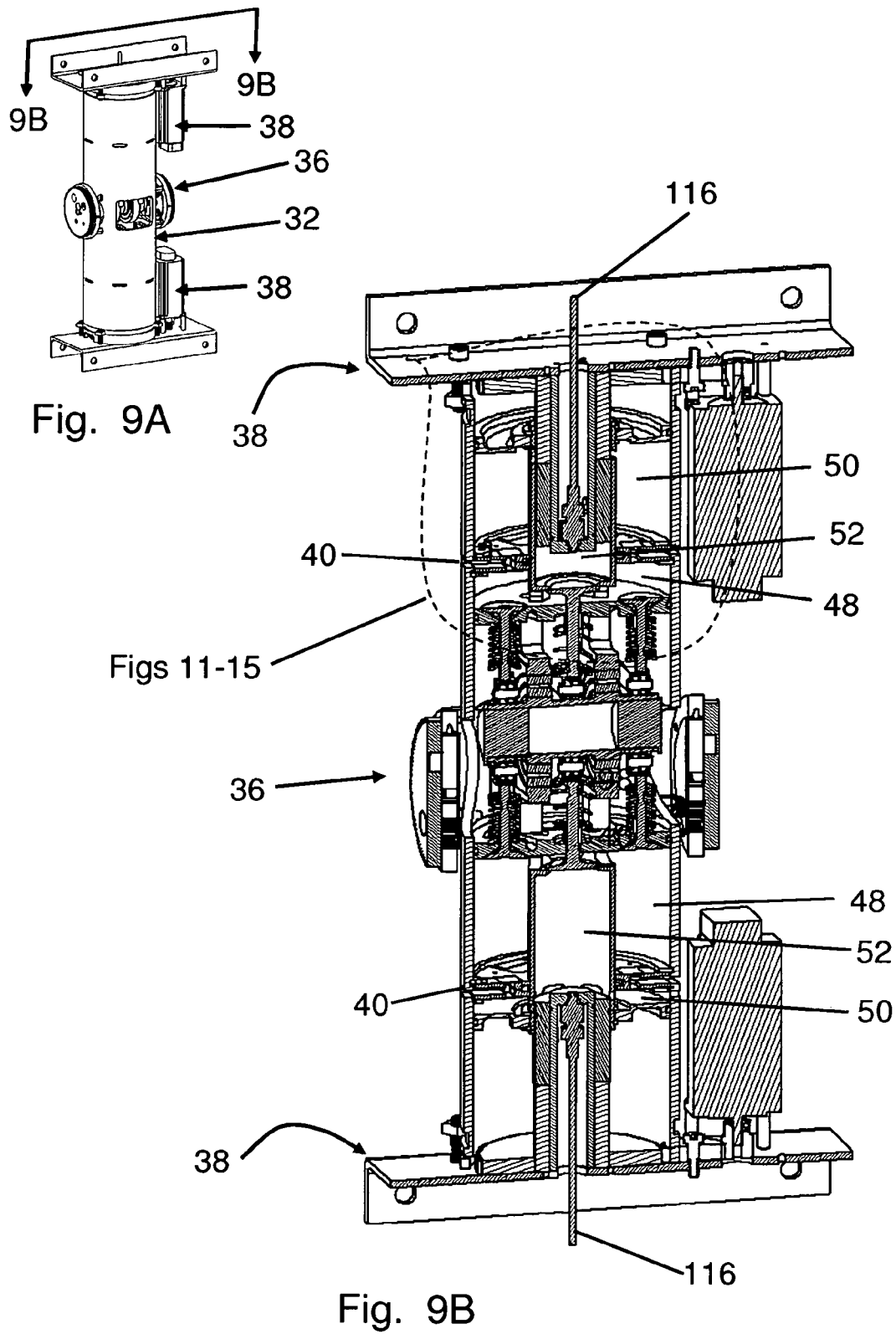
FIG. 9A shows the preferred embodiment and section line for FIG. 9B.
FIG. 9B is a detailed sectional view of the preferred embodiment.

FIG. 9A shows the preferred embodiment with section line 9B. Sectional view 9B includes the fuel injector 116 for completeness. Notice that the volumes of the volumes of the combustion chambers are complementary. This is because the inlet valve projects in to the double pistons differently. The volumes of the superchargers are different. As one supercharger is expanding, the other is contracting. They are 180° out of phase. Likewise for the regenerator chambers.

Supercharger Operation

Figure 10A:
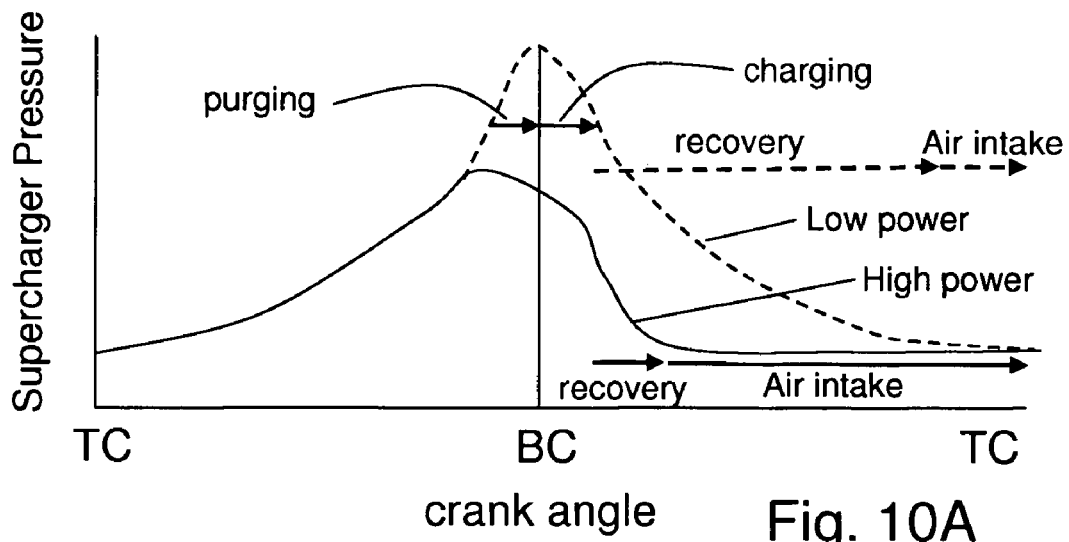
FIGS. 10A-C show the supercharger, combustion chamber and regenerator chamber pressure for one revolution.

FIG. 10A shows the supercharger pressure history for one revolution of the crankpin. Consider the low power case which is the dashed line. At TC, the supercharger is at its maximum volume. Supercharger compression starts and the pressure increases. At BC, the pressure is at is maximum. If the inlet valve were closed, almost all of the work would be returned to the crankshaft as the compressed air expands. The dashed line labeled recovery represents this process. The dashed line labeled air intake would be essentially zero. One skilled in the art, would see an application for such a process—cold weather starting. It is well known that self ignition is difficult at low temperatures. Preheaters are frequently used during starting. Repeated compression and decompression with the inlet valve closed will heat the trapped air.

Consider the high power case, the solid line in FIG. 10A. Starting from TC, the pressure is the same as the low power case until the inlet port opens. This is the start of purging. The inlet valve opens early for the high power case so the supercharger pressure drops first. At BC, the supercharger is at minimum volume and the transfer valve closes. This is the end of purging and the start of charging. In the preferred embodiment, the combustion chamber is charged to two atmospheres at high power. This implies that the supercharger pressure will be at least two atmospheres when charging is complete. As the cycle continues the volume of the supercharger increases and the pressure decreases. This is identified as the solid line labeled recovery the FIG. 10A. The work required to compress the air within the supercharger is returned. This recovery continues until the pressure in the supercharger drops below atmospheric. Then air enters 58 though the reed valves 56; this is the solid line labeled air intake.

Supercharger Sizing

The following discussion shows how a designer can select the proper supercharger size. For the sake of explanation, assume the engine displacement were 1 liter and his goal is to purge the combustion chamber and provide a 2 atmosphere air charge at full power. The first step is to estimate the supercharger maximum volume. Assume 6 liters. The next step is to assume a supercharger compression ratio, assume 6/1. Consider the high power case. A minimum of one liter of the supercharger air is required for purging. Assume that some mixing of the incoming air and combustion gases occurs and that 1.5 liters is needed. At the end of purging, the combustion chamber is full of fresh air. The next step is to increase the combustion chamber pressure to 2 atmospheres. If the combustion chamber remained at one liter of volume, this would require one liter of air. However during charging, the combustion chamber volume is decreasing. When the inlet valve closes, the volume will be 90% of its original volume. Therefore an additional 0.9 liters of air is required to supercharge the combustion chamber. A total of 2.4 liters is consumed in one revolution.

Since the goal is to charge the combustion chamber to 2 atmospheres, the pressure in the supercharger must be greater than that. Assume the supercharger pressure is 2.2 atmospheres. The next step is to determine the supercharger volume at the end of charging. The assumed supercharger compression ratio is 6/1. Therefore the volume at BC is 1 liter. Charging ends when the piston has moved 10% of its stroke. The change in supercharger volume is 5 liters (6 L−1 L=5 L); 10% of this is 0.5 liters. Therefore the volume of the supercharger at the end of charging is 1.5 liters. The supercharger pressure at this time is 2.2 atmospheres. The volume of air within is 1.5*2.2=3.3 liters. The sum of consumed air and the required air within the supercharger at the end of charging is 2.4 L+3.3 L=5.7 L. Consequently the assumed supercharger compression ratio of 6/1 is slightly greater than required. If a more accurate size is needed, the designer would correct his initial assumptions and redo the calculation.

The previous discussion shows an important variation, a high altitude application. If the supercharger is considerable larger, for example 12 times bigger than the combustion chamber, it would have sufficient capacity to charge the engine when the atmospheric pressure were reduced by 50%. Consequently, an aircraft could have full power at high altitude.

Combustion Chamber and Regenerator Operation

Figure 10B:
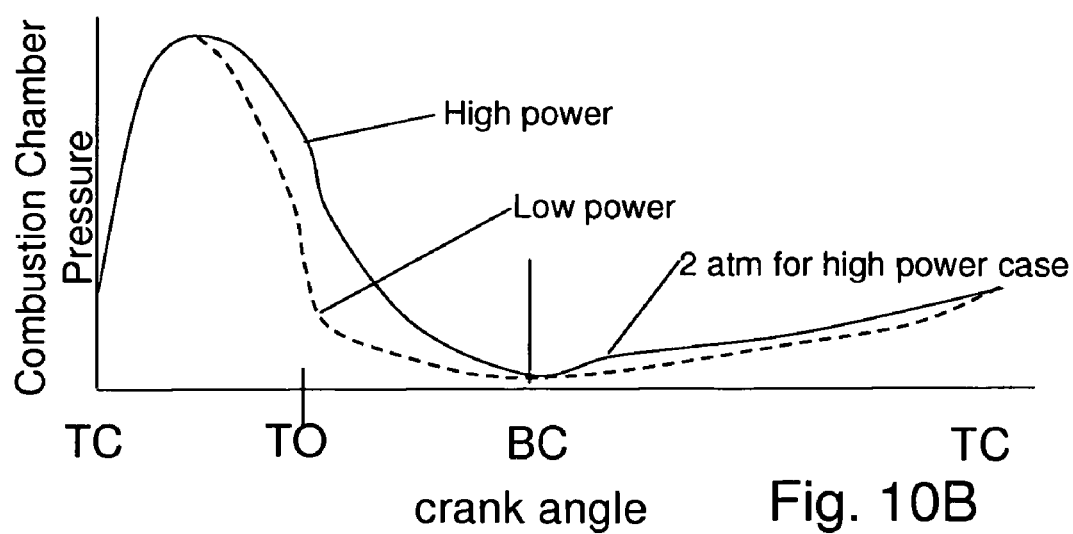

FIG. 10B shows the combustion chamber pressure history for one revolution of the crankpin. The solid line is for the high power case. The dashed line is for the low power case. When FIG. 10B is reviewed in conjunction with FIG. 2, the pressure history is obvious. Starting from TC, the pressure is the same for high and low power. The large fuel load at high power extends the duration of the high pressure since the volume of the combustion chamber is bigger. When the transfer valve opens, TO, the power stroke continues within the regenerator. At BC, the pressures are equal and at one atmosphere. But at the end of charging, the high power case is at higher pressure. However the high power case has a larger combustion chamber. At the end of the compression stroke, the pressures are again equal.

Figure 10C:
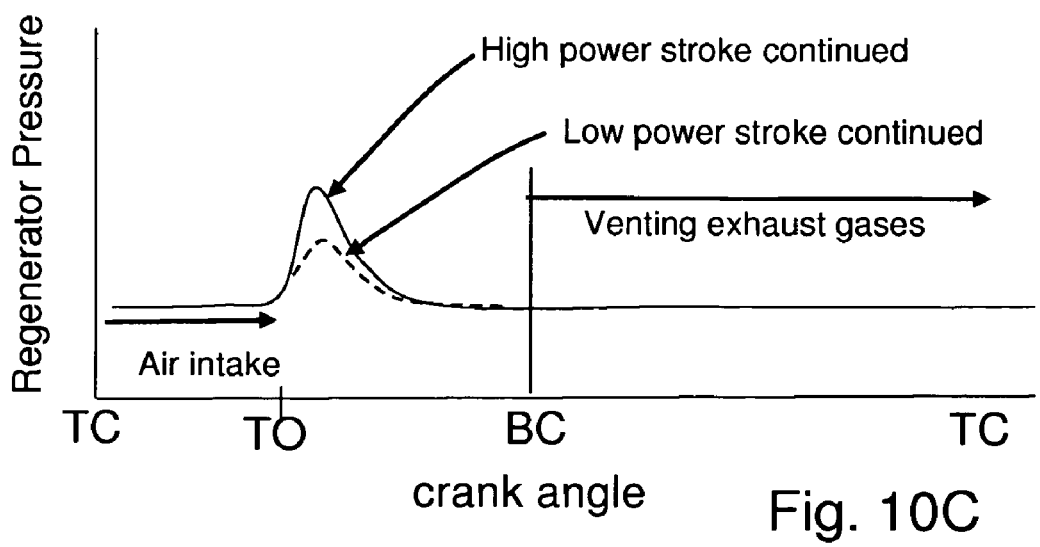

FIG. 10C show the regenerator pressure history for one revolution of the crankpin. Starting from TC, the volume of the regenerator increases and the reed valves 56 allow air 60 to enter. When the transfer valve opens, TO, hot high pressure combustion gases enter and mix with the cold air in the regenerator. In the preferred embodiment, the mass of cold air within the regenerator is approximately equal to the mass of combustion gasses. The mixed temperature will be approximately half way between the two initial temperatures. However, the well known thermodynamic principle of Charles's law indicates that the volume of the mixed gases will increase. Mixing is an effective method to convert the thermal energy of the exhaust into extra volume that can be used to expand and produce power. At BC, the regenerator is at maximum volume and trapped gases within it have expanded and cooled and the exhaust valves open and the gases are pushed out.

There are three advantages over traditional engines: 1) the pressures are much lower so the noise associated with exhaust is greatly reduced; 2) the temperatures are lower because the gases mixed with cold air and expanded doing more work and 3) the exhaust process is extended over 180° of crank rotation so the velocity and pressure drop is reduced. A fourth possible advantage is in pollution control. The regenerator is a potential catalytic converter chamber.

Inlet Valve Operation

Figure 11:
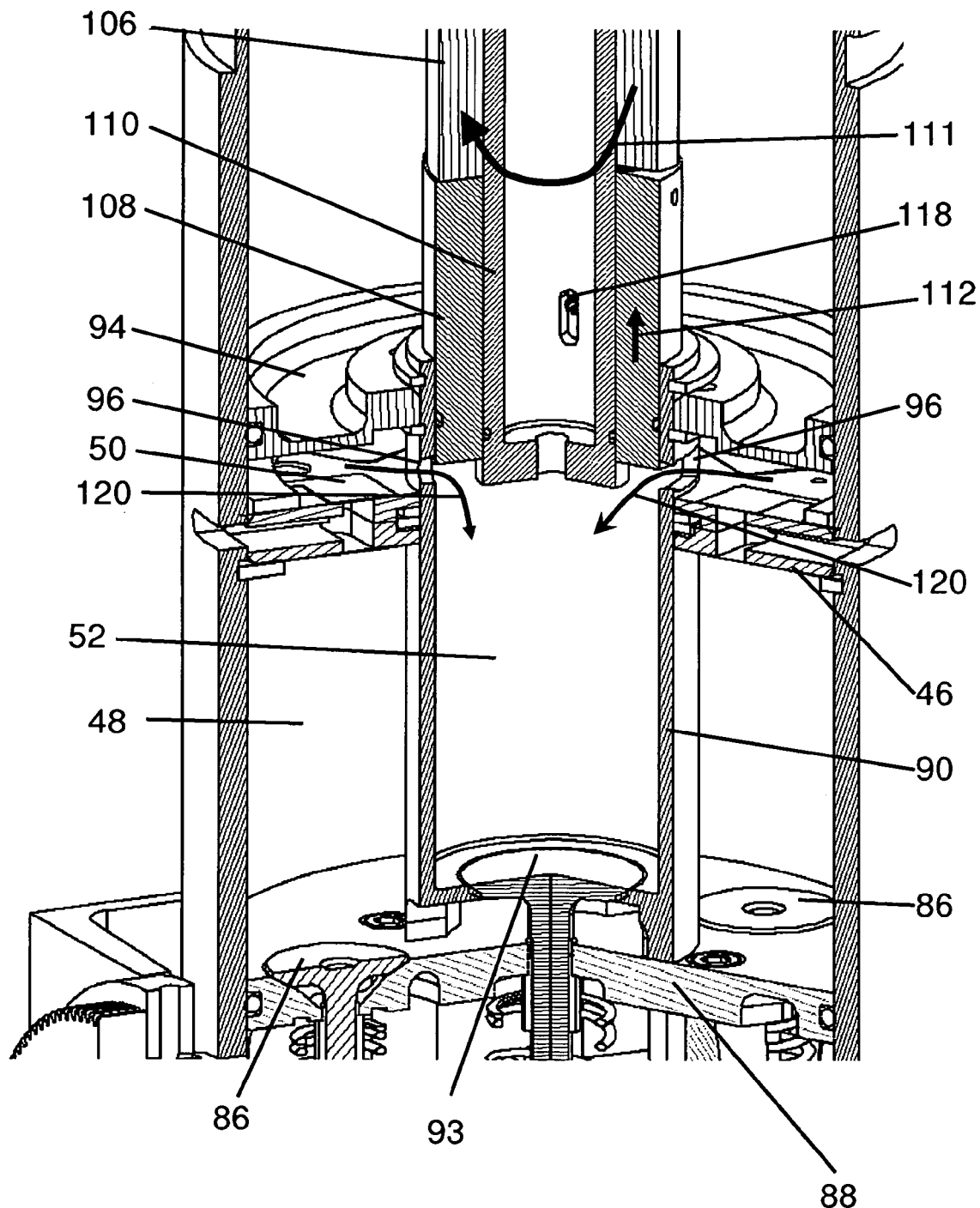
FIG. 11 shows a sectional view of one cylinder with the inlet valve at full power.

FIG. 11 shows a detailed view of one cylinder shown in FIG. 9. Details will now be explained. In FIG. 11, the inlet valve is in a full flow position and the supercharger is close to fully compressed. Supercharged air 120 can enter the combustion chamber through the combustion chamber inlet ports 96. The inlet valve 108 can only move in an axial direction because it is restrained by pin and slot 118. The fuel injector has been hidden to expose the slot. Rotation of riser 106 controls the inlet valve axially. Riser rotation 111 would cause movement 112 of the inlet valve to add more power. Note that FIG. 11 is upside down when compared to FIG. 8A.

Figure 12:
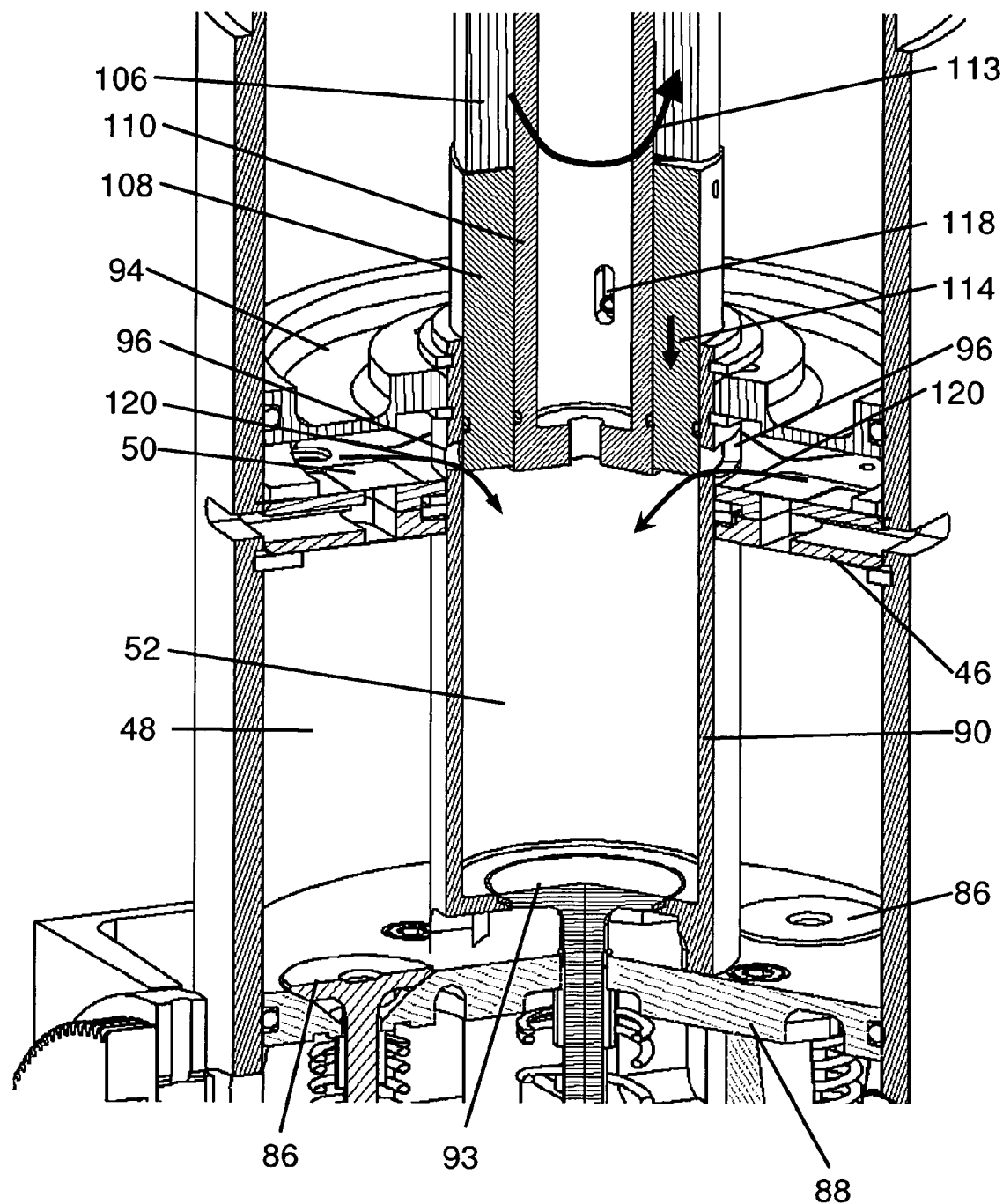
FIG. 12 shows a sectional view of one cylinder with the inlet valve at low power.

FIG. 12 shows an detailed view of FIG. 9 but with the inlet valve almost closed. The blockage of the combustion chamber inlet ports 96 is evident. Air flow from the supercharger 120 is limited. The riser 106 has been rotated 113 to move 114 the inlet valve and block in the inlet port. FIG. 11 and 12 illustrate the process at BC, when the transfer valve has just closed and the exhaust valves are about to open.

Detailed Review of Engine Operation

Figure 13A:
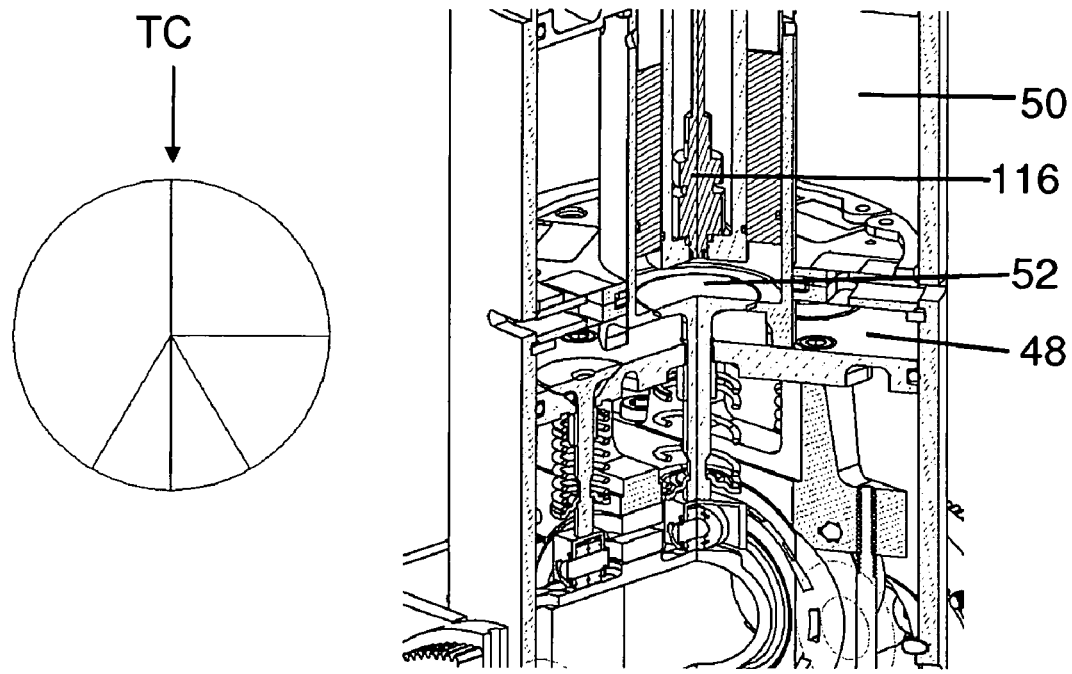
FIG. 13A is a sectional view of one cylinder, at TC (self ignition) and full power.

FIGS. 13, 14 and 15 show sectional views (from FIG. 9B) of one cylinder at different phases in the two-stroke process. This sequence will explain how the air moves from chamber to chamber. The symbol to the left of the figure shows the process location as done in FIG. 2B. FIG. 13A shows a sectional view of a cylinder at TC. The supercharger chamber 50 is at maximum volume and has just completed its intake stroke. The air within the supercharger is at atmospheric pressure. The combustion chamber 52 is at minimum volume; the air charge has been compressed and is ready for fuel and self ignition. The fuel injector 116 is about to inject fuel. The regenerator chamber 48 has just completed its exhaust stroke by forcing all the combustion gasses out.

Figure 13B:
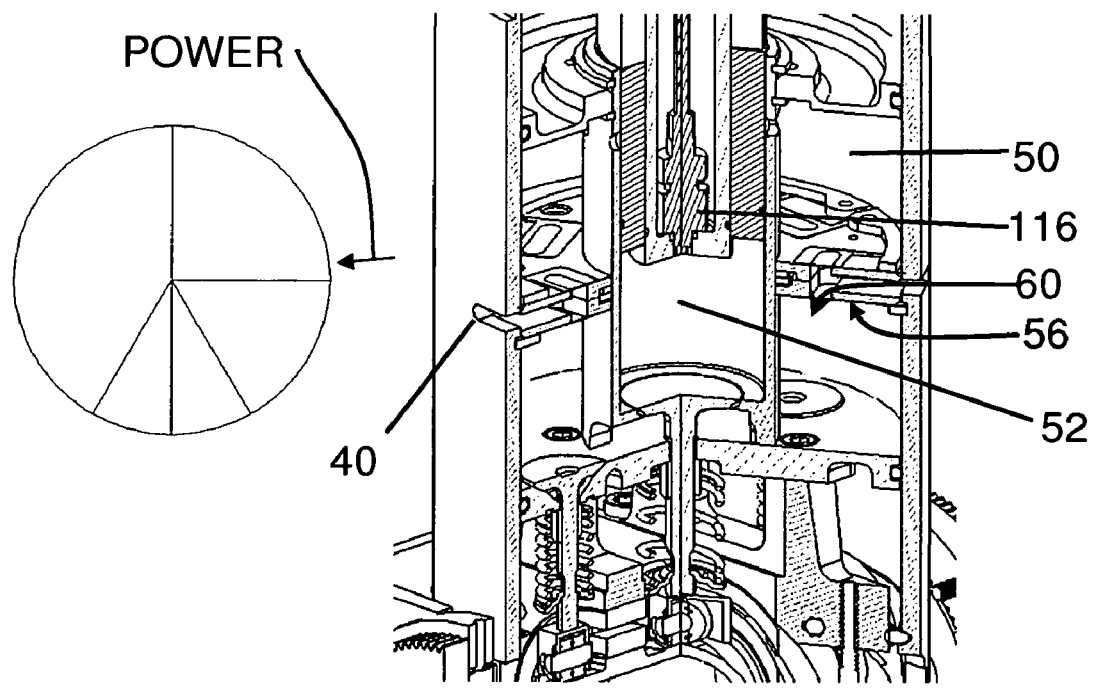
FIG. 13B is a sectional view of one cylinder, at 90° (power) and full power.

FIG. 13B show a sectional view of a cylinder in the power stroke with the crank angle at slightly less than 90°. The supercharger 50 is about half way through its compression stroke and its pressure will be approximately 2 atmospheres. Air 60 would be entering the regenerator chamber 48 though air inlet ports 40 and reed valves 56. The pressure in the regenerator would be slightly less than atmospheric as to induct air. The combustion chamber 52 would have high pressure and temperature gases producing power.

Figure 14A:
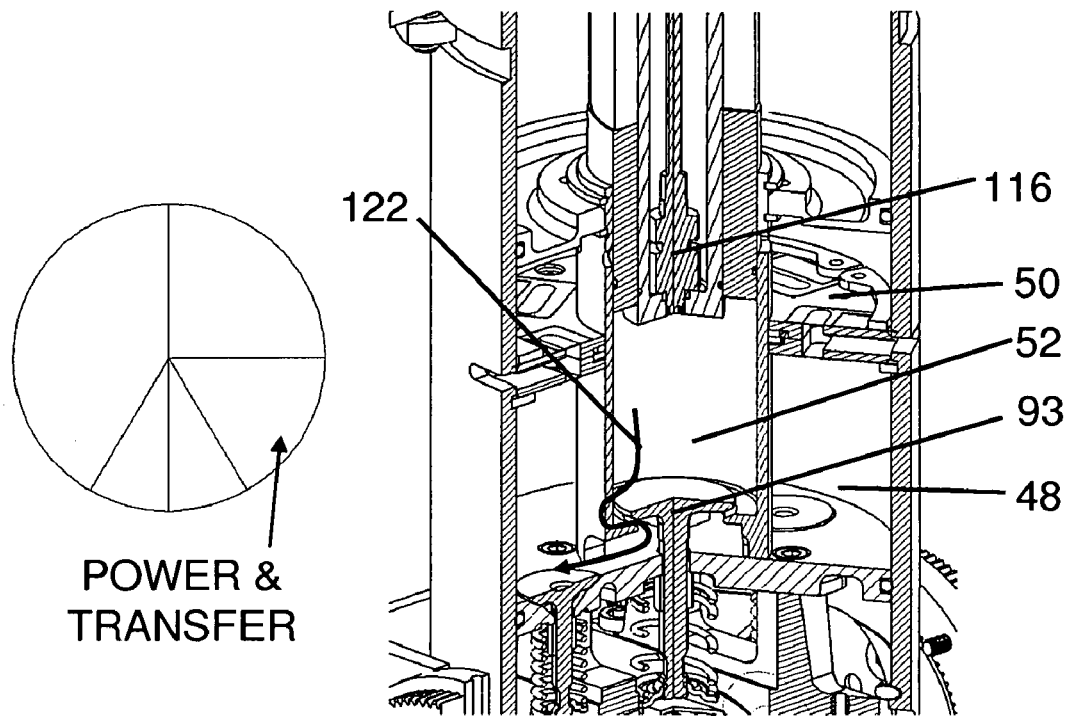
FIG. 14A is a sectional view of one cylinder, at 135° (power & transfer) and full power.

FIG. 14A show a sectional view of a cylinder in the power & transfer stroke with the crank angle at approximately 135°. The supercharger 50 is about ¾ through its compression stroke and its pressure will be approximately 4 atmospheres. The transfer valve 93 is open and combustion gases 122 are flowing from the combustion chamber 52 to the regenerator chamber 48. The outside air within the regenerator has mixed with combustion gases. The regenerator is producing power.

Figure 14B:
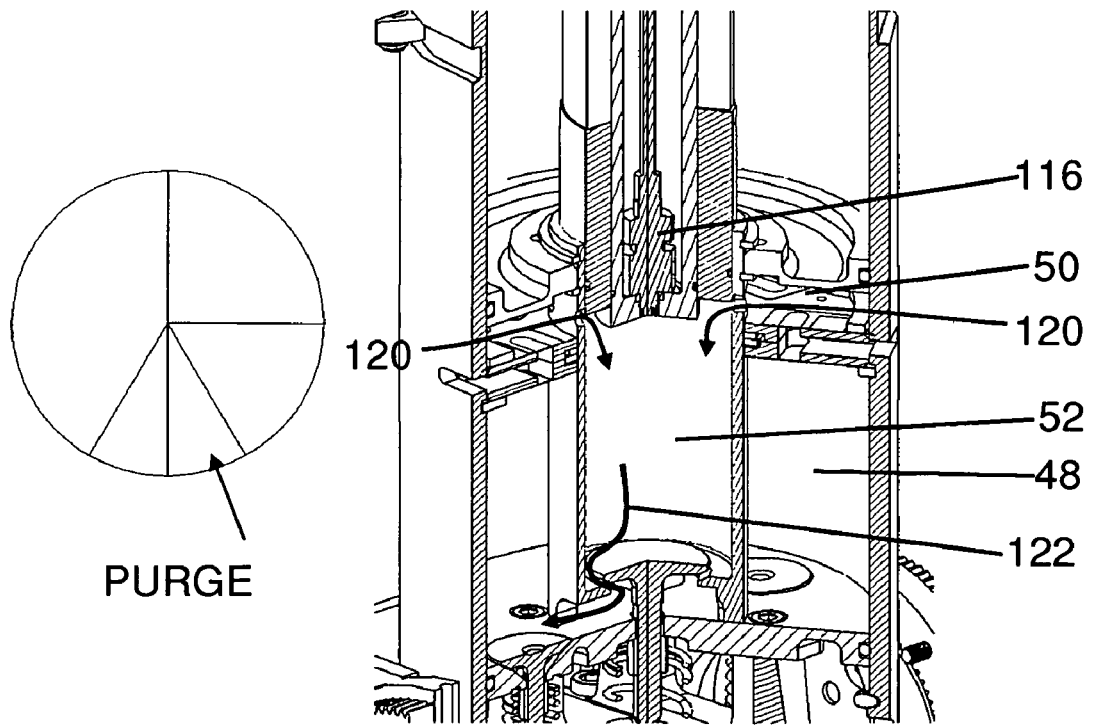
FIG. 14B is a sectional view of one cylinder, at 160° (purge) and full power.

FIG. 14B shows a sectional view of a cylinder in the purge phase with the crank angle at approximately 160°. The supercharger chamber 50 is about 90% through its compression stroke. The combustion chamber inlet ports 96 to the combustion chamber are open and supercharger air 120 is forcing the combustion gases from the combustion chamber. The volume of the supercharger is still decreasing but its pressure is dropping because the purge flow will be greater than its change in volume. The pressure will be approximately 4 atmospheres. The transfer valve is open and combustion gases 122 move from the combustion chamber to the regenerator. The regenerator pressure is close to atmospheric.

FIG. 15A shows a sectional view of a cylinder in the charge phase with the crank angle at approximately 200°. The supercharger chamber 50 is starting it expansion stroke but is still pressurized. The combustion chamber inlet ports 96 to the combustion chamber are open and supercharged air 120 is entering the combustion chamber 52. At the end of the charge phase, the combustion chamber and supercharger pressure will be approximately 2 atmospheres. The exhaust valves 86 are open and exhaust gases 124 are being pushed from the regenerator. As rotation continues, the supercharger will expand and do work until its pressure drops below atmospheric. The recovered power from the supercharger will help compress the air charge in the combustion chamber.

FIG. 15B shows a sectional view of a cylinder in the compression stroke with the crank angle at approximately 270°. The supercharger chamber is expanding and if its pressure has dropped below atmospheric, air 58 will enter through the inlet air ports 40. The air charge in the combustion chamber 52 will be approximately at 4 atmospheres. The regenerator chamber 48 will be about half way through it exhaust stroke. The rotation will continue until TC and the process will repeat.

The invention claimed is:

1. A two-stroke internal combustion engine with opposed cylinders which utilizes an integrated positive displacement supercharger and regenerator comprising:

at least one cylinder housing assembly forming two opposed cylinders sharing a common axis, each cylinder having an outward facing end, an inward facing end facing the other cylinder and, between the ends, a fixed annular partition extending radially inward in the cylinder and having a supercharger side and a regenerator side;

two double piston assemblies encircled by the cylinder housing assembly, wherein each double piston assembly includes a hollow cylindrical body having an outer end and an inner end and defining a combustion chamber;

an annular supercharger piston affixed at the outer end of the hollow cylindrical body, wherein said hollow body has circumferential perforations adjacent the supercharger piston; and a regenerator piston affixed at the inner end of the hollow cylindrical body, wherein the regenerator piston has at least one integrated exhaust valve suitable for fluid flow in the inward direction; and the inner end of the hollow cylindrical body is controllably sealed with an integrated transfer valve enabling fluid flow out of the combustion chamber in the inward direction with respect to the cylinder housing assembly;

in each cylinder, a supercharger chamber;

in each cylinder, a regenerator chamber separate from the supercharger chamber;

an inlet valve assembly at the outward facing end of each cylinder, and a crankpin mounted on the cylinder housing assembly between the opposed cylinders, the crankpin having integrated cam lobes to actuate the at least one exhaust valve and being orientated such that the axis of the crankpin is perpendicular to the common axis of the cylinder housing assembly wherein the fluid flow out of the combustion chamber flows into the regenerator chamber, but fluid does not flow from the regenerator chamber into the combustion chamber.

2. The internal combustion engine according to claim 1, wherein each hollow cylindrical body is sealed at the outer end by the inlet valve assembly and sealed at the inner end by the transfer valve; wherein the combustion chamber receives air through the circumferential perforations from the supercharger chamber, receives fuel from the inlet valve assembly, and discharges combustion gases through the transfer valve into the regenerator chamber; wherein the hollow cylindrical body is operably associated with the crankpin; and wherein a cam lobe on the crankpin actuates said transfer valve.

3. The internal combustion engine according to claim 1, wherein the inlet valve assembly comprises a slideable inlet valve and a rotating riser encircling an injector barrel, each of the slidable inlet valve, rotating riser and injector barrel being concentrically aligned with the hollow cylindrical body, wherein rotation of the riser causes axial sliding motion of the inlet valve thus controlling fluid communication from the supercharger chamber to the combustion chamber while altering the volume of the combustion chamber and thus maintaining a constant compression ratio within the combustion chamber.

4. The internal combustion engine according to claim 1, wherein each supercharger chamber is defined by one of the opposed cylinders, one of the supercharger pistons, one of the hollow cylindrical bodies and one of the fixed annular partitions; wherein ambient air is drawn into the supercharger chamber through a plurality of one-way valves within said one of the fixed annular partitions; and wherein the air in the supercharger chamber is discharged into the combustion chamber through circumferential perforations in the hollow cylindrical body.

5. The internal combustion engine according to claim 4, wherein the supercharger chamber is self-regulated and returns any power consumed in compressing unused air to an output drive mechanism.

6. The internal combustion engine according to claim 1, wherein each supercharger chamber is defined by one of the opposed cylinders, one of the supercharger pistons, one of the hollow cylindrical bodies and one of the fixed annular partitions; wherein ambient air is drawn into the supercharger chamber through a plurality of one-wa y valves within said one of the fixed annular partitions, said air fills the supercharger chamber, and the air in the supercharger chamber is fed into the combustion chamber through circumferential perforations in the hollow cylindrical body when the reciprocating combustion chamber exposes the circumferential perforations.

7. The internal combustion engine according to claim 6, wherein the supercharger chamber is self-regulated and returns any power consumed in compressing unused air to an output drive mechanism.

8. The internal combustion engine according to claim 1, wherein each regenerator chamber is defined by the one of the opposed cylinders, one of the regenerator pistons, one of the hollow cylindrical bodies and one of the fixed annular partitions; wherein ambient air is drawn in through a plurality of one-way valves within said one fixed annular partition; the drawn in air partially fills the regenerator chamber; combustion gases as controlled by the transfer valve mix with the drawn in ambient air; and mixed gases are discharged to the environment as controlled by the at least one integrated exhaust valve; and, said at least one integrated exhaust valve is seated on the regenerator piston and activated by a cam lobe on the crankpin.

9. The two-stroke internal combustion engine according to claim 1, wherein each regenerator chamber is defined by one of the opposed cylinders, one of the regenerator pistons, one of the hollow cylindrical bodies and one of the fixed annular partitions; wherein ambient air is drawn in through a plurality of one-way valves within the regenerator piston; the drawn in ambient air partially fills the regenerator chamber; combustion gases controlled by the transfer valve mix with the the drawn in ambient air; and mixed gases resulting from the mixing of the combustion gases and the drawn in ambient air are discharged to the environment as controlled by the at least one exhaust valve.

10. The two-stroke internal combustion engine according to claim 9, wherein the at least one exhaust valve is seated on the regenerator piston and activated by the crankpin.

11. The two-stroke internal combustion engine according to claim 1, wherein the crankpin converts the reciprocating motion of the double piston assembly into rotary motion at a power take-off gear to insert or remove power.

12. The internal combustion engine according to claim 1, wherein the crankpin converts the reciprocating motion of the double piston assembly into rotary motion at a power take-off gear to insert or remove power and the crankpin functions as a camshaft to actuate the at least one exhaust valve and the transfer valve.

13. The internal combustion engine according to claim 1, wherein each regenerator chamber is defined by the one of the opposed cylinders, one of the regenerator pistons, one of the hollow cylindrical bodies, and one of the fixed annular partitions; wherein ambient air is drawn in through a plurality of one-way valves within the regenerator piston; said drawn in air partially fills the regenerator chamber; combustion gases as controlled by the transfer valve mix with the drawn in ambient air; and mixed gases are discharged to the environment as controlled by the at least one exhaust valve; and said at least one exhaust valve is integrated seated on the regenerator piston and activated by cam lobes on the crankpin.

14. The internal combustion engine according to claim 1, wherein the inlet valve assembly has a fixed fuel injector barrel, a slideable inlet valve and a rotating riser.

* * * * *